United States Patent
Honda et al.

(10) Patent No.: US 10,557,523 B2
(45) Date of Patent: Feb. 11, 2020

(54) PLANETARY GEAR TRAIN OF INTERNAL ENGAGEMENT TYPE

(71) Applicant: DENSO CORPORATION, Kariya, Aichi-pref. (JP)

(72) Inventors: Yukihiro Honda, Kariya (JP); Soichi Kinouchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 15/993,704

(22) Filed: May 31, 2018

(65) Prior Publication Data
US 2018/0355952 A1  Dec. 13, 2018

(30) Foreign Application Priority Data

Jun. 12, 2017  (JP) .................................. 2017-114948

(51) Int. Cl.
*F16H 1/32*  (2006.01)

(52) U.S. Cl.
CPC ......... *F16H 1/32* (2013.01); *F16H 2001/325* (2013.01)

(58) Field of Classification Search
CPC ....................................................... F16H 1/32
See application file for complete search history.

(56) References Cited

U.S. PATENT DOCUMENTS

| | | | |
|---|---|---|---|
| 9,856,945 B2* | 1/2018 | Tabuchi | F16H 55/08 |
| 10,174,826 B2* | 1/2019 | Nagata | F16H 55/08 |
| 2005/0059524 A1* | 3/2005 | Hori | F16H 1/32 |
| | | | 475/180 |
| 2016/0084348 A1 | 3/2016 | Tabuchi et al. | |

FOREIGN PATENT DOCUMENTS

JP  4107895  6/2008

* cited by examiner

*Primary Examiner* — Derek D Knight
(74) *Attorney, Agent, or Firm* — Nixon & Vanderhye P.C.

(57) ABSTRACT

Each of an external tooth-bottom surface and an external bottom-side contact surface has a cross-sectional shape formed by a hypocycloid curved line. An external front-side contact surface has a cross-sectional shape formed by an epicycloid curved line. An external tooth-front surface is formed at a radial-inside position of a reference epicycloid curved line, that is, a position closer to a first pitch circle of an external gear. A possible contact between a tooth-front portion of the external gear and a tooth-front portion of an internal gear can be avoided. A connecting point between the external tooth-front surface and the external front-side contact surface is located at such a position that a contact surface length of an external tooth-contact surface is larger than twenty percent of a total tooth surface of the external gear.

12 Claims, 17 Drawing Sheets

PLANETARY GEAR TRAIN OF INTERNAL ENGAGEMENT TYPE

CROSS REFERENCE TO RELATED APPLICATION

This application is based on Japanese Patent Application No. 2017-114948 filed on Jun. 12, 2017, the disclosure of which is incorporated herein by reference.

FIELD OF TECHNOLOGY

The present disclosure relates to a planetary gear train of an internal engagement type.

BACKGROUND

The planetary gear train of the internal engagement type is known in the art. For example, the planetary gear train of the internal engagement type is used in a speed decreasing device, a speed increasing device and so on. The planetary gear train of the internal engagement type has an internal gear and an external gear, which is internally engaged with the internal gear.

In each of the internal gear and the external gear for the planetary gear train of the internal engagement type, which is disclosed in Japanese Patent Publication No. 2016-65579 (corresponding to U.S. Pat. No. 9,856,945 B2), a run-out portion is formed at a tooth-front portion of a gear tooth. A possible contact between the tooth-front portion of the internal gear and the tooth-front portion of the external gear is avoided by the above run-out portion in a teeth non-engagement area, in which the gear tooth of the internal gear and the gear tooth of the external gear are out of engagement between them.

The above prior art, however, does not disclose a definite design standard for a size of the run-out portion of the external gear or the internal gear. A contact surface length of the gear tooth between the external gear and the internal gear may be decreased depending on an amount of the run-out portion. Durability of the planetary gear train is thereby decreased.

SUMMARY OF THE DISCLOSURE

The present disclosure is made in view of the above problem. It is an object of the present disclosure to provide the planetary gear train of the internal engagement type, according to which it is possible not only to prevent a decrease of torque transmission efficiency but also to prevent a decrease of durability of the planetary gear train.

According to a feature of the present disclosure, a planetary gear train of an internal engagement type comprises an internal gear and an external gear, which is internally and operatively engaged with the internal gear.

In the present disclosure, a pitch circle of the external gear is referred to as a first pitch circle, a pitch circle of the internal gear is referred to as a second pitch circle, and a cross section perpendicular to a center axis of the internal gear is referred to as a transverse cross section.

The external gear has multiple external gear teeth at an outer peripheral portion thereof, each tooth surface of which includes an external tooth-bottom surface, an external tooth-front surface and an external contact surface formed between the external tooth-bottom surface and the external tooth-front surface. The external contact surface includes an external bottom-side contact surface connected to the external tooth-bottom surface and an external front-side contact surface connected to the external tooth-front surface.

Each of the external tooth-bottom surface and the external bottom-side contact surface is located at a radial-inside position of the first pitch circle of the external gear, while each of the external tooth-front surface and the external front-side contact surface is located at a radial-outside position of the first pitch circle of the external gear.

A transverse cross-sectional shape of the external tooth-bottom surface as well as a transverse cross-sectional shape of the external bottom-side contact surface is formed by a hypocycloid curved line, while a transverse cross-sectional shape of the external front-side contact surface is formed by an epicycloid curved line.

The internal gear has multiple internal gear teeth at an inner peripheral portion thereof, each tooth surface of which includes an internal tooth-bottom surface, an internal tooth-front surface and an internal contact surface formed between the internal tooth-bottom surface and the internal tooth-front surface. The internal contact surface includes an internal bottom-side contact surface connected to the internal tooth-bottom surface and an internal front-side contact surface connected to the internal tooth-front surface.

Each of the internal tooth-bottom surface and the internal bottom-side contact surface is located at a radial-outside position of the second pitch circle of the internal gear, while each of the internal tooth-front surface and the internal front-side contact surface is located at a radial-inside position of the second pitch circle of the internal gear.

A transverse cross-sectional shape of the internal front-side contact surface is formed by the hypocycloid curved line, while a transverse cross-sectional shape of the internal bottom-side contact surface as well as a transverse cross sectional shape of the internal tooth-bottom surface is formed by the epicycloid curved line.

In addition, the planetary gear train of the present disclosure has the following two characterizing points;

(A) the external tooth-front surface is formed at a radial-inside position of a reference epicycloid curved line, which is continuously connected to the external front-side contact surface, and (B) a connecting point between the external tooth-front surface and the external front-side contact surface is located at such a point that a contact surface length of the external contact surface becomes equal to or more than twenty percent of a total surface length of the external tooth in the transverse cross section.

According to another feature of the present disclosure, the planetary gear train of the present disclosure has the following two characterizing points;

(C) the internal tooth-front surface is formed at a radial-outside position of a reference hypocycloid curved line, which is continuously connected to the internal front-side contact surface, and (D) a connecting point between the internal tooth-front surface and the internal front-side contact surface is located at such a point that a contact surface length of the internal contact surface becomes equal to or more than twenty percent of a total surface length of the internal tooth in the transverse cross section.

According to the above characterizing points (A) and (C), a run-out portion is formed either at the external tooth-front surface of the external gear or at the internal tooth-front surface of the internal gear, so as to avoid such a situation that the external tooth-front surface is brought into contact with the internal tooth-front surface in the teeth non-engagement area of the external gear and the internal gear. As a result, friction loss which may be caused by a possible contact between the external gear and the internal gear in the teeth non-engagement area can be decreased. It is therefore possible to prevent a decrease of the efficiency of the torque transmission.

In addition, according to the above characterizing points (B) and (D), the run-out portion is formed either at the external tooth-front surface or at the internal tooth-front surface in order that a contact surface length of the gear tooth in the teeth engagement area becomes equal to or larger than twenty percent (20%) of a total tooth surface length in the transverse cross section. Accordingly, it is possible to prevent a decrease of durability, which would be caused by the decrease of the contact surface length between the external gear and the internal gear.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
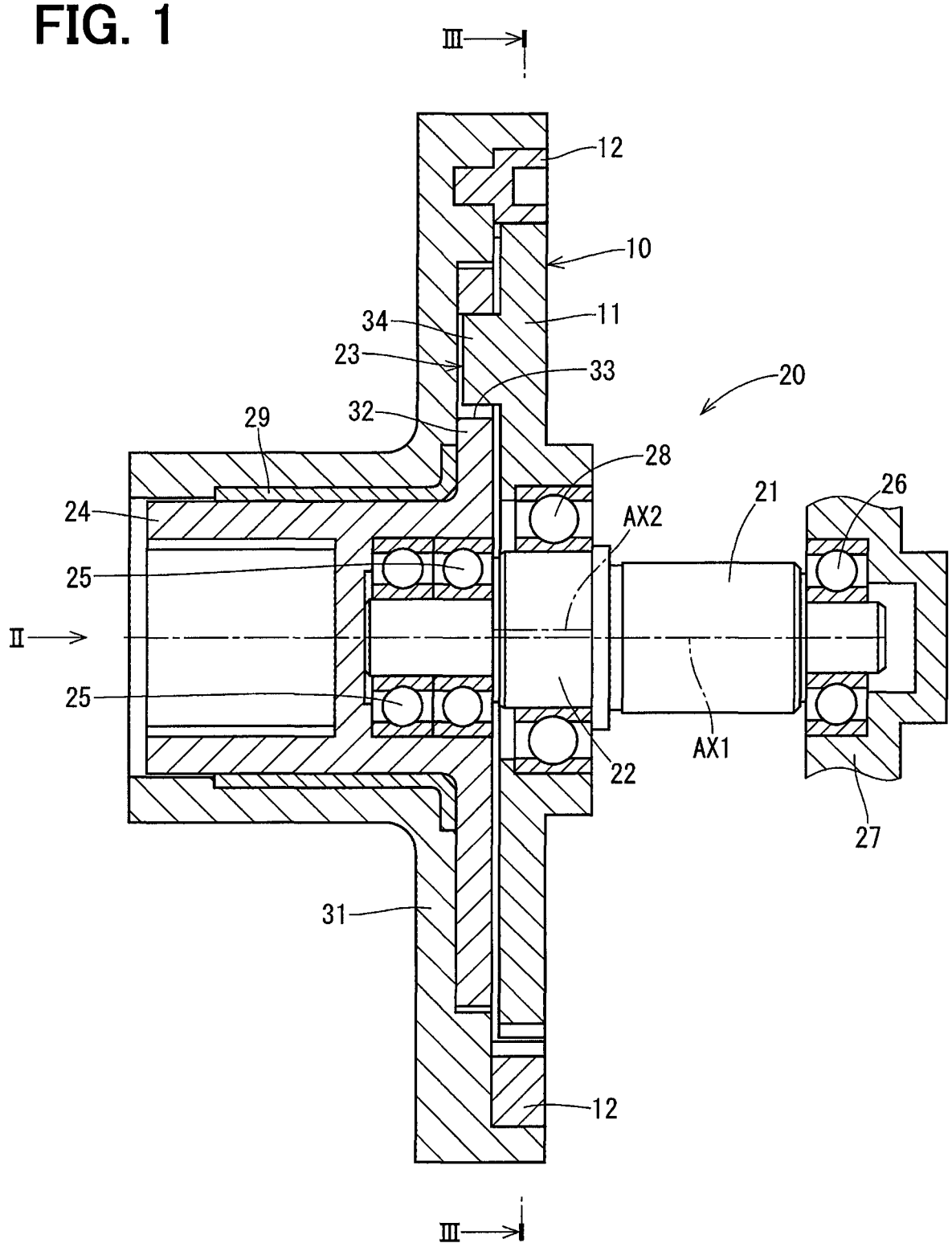
FIG. 1 is a schematic cross sectional view showing an outline of a speed decreasing device according to a first embodiment of the present disclosure, wherein a planetary gear train of an internal engagement type is used.

The present disclosure will be explained hereinafter by way of multiple embodiments and/or modifications with reference to the drawings. The same reference numerals are given to the same or similar structure and/or portion in order to avoid repeated explanation.

First Embodiment

A speed decreasing device 20 of a first embodiment of the present disclosure is shown in FIG. 1, to which a planetary gear train 10 of an internal engagement type is applied. For example, the speed decreasing device 20 is installed in a vehicle in order to decrease a rotational speed of an electric motor, which is a driving portion for a shift-by-wire system.

Figure 2:
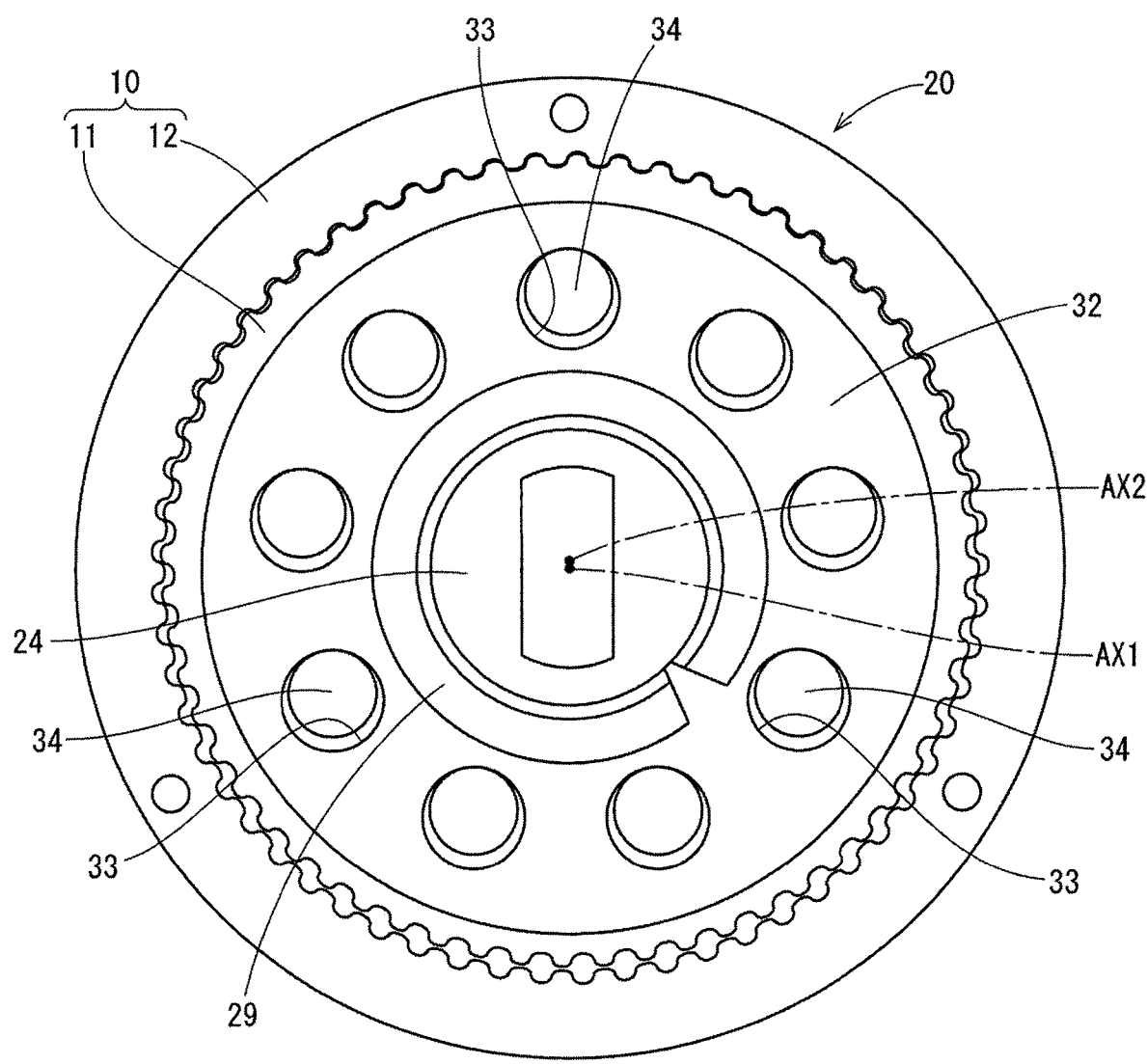
FIG. 2 is a schematic side view showing the speed decreasing device, when viewed it in a direction of an arrow II in FIG. 1 in a condition that a front housing is removed.

At first, a structure of the speed decreasing device 20 will be explained with reference to FIGS. 1 to 3.

The speed decreasing device 20 is composed of (but not limited thereto);

a first shaft 21;

an eccentric portion 22 integrally formed with the first shaft 21;

an external gear 11 supported by the first shaft 21 via the eccentric portion 22, so that the external gear 11 is eccentrically rotated with respect to the first shaft 21;

an internal gear 12, with which the external gear 11 is internally engaged;

a transmission unit 23 for transmitting only a self-rotation component of the external gear 11; and a second shaft 24 connected to the external gear 11 via the transmission unit 23.

The external gear 11 and the internal gear 12 form the planetary gear train 10 of the internal engagement type.

The first shaft 21 is an input shaft, which is rotatably supported by bearings 25 and 26. The bearing 25 is provided in the second shaft 24. The bearing 26 is provided in a rear housing 27, which is located at a position opposite to the second shaft 24.

The eccentric portion 22 is formed around an eccentric center axis AX2, which is eccentric to a center axis AX1 of the first shaft 21. The eccentric center axis AX2 is rotated around the center axis AX1. A bearing 28 is provided at an outer periphery of the eccentric portion 22.

The second shaft 24 is an output shaft, which is rotatably supported by a sliding bearing 29 provided in a front housing 31. The internal gear 12 is coaxially arranged with the center axis AX1 of the first shaft 21 and fixed to the front housing 31.

The external gear 11 is rotatably supported by the bearing 28, so that the external gear 11 moves in a sun-and-planet motion by keeping an internal engagement between the external gear 11 and the internal gear 12, when the eccentric portion 22 is rotated.

In the sun-and-planet motion, the external gear 11 is rotated around the eccentric center axis AX2 (a self-rotational motion) and moves around the center axis AX1 (an orbital motion).

The transmission unit 23 has multiple pin holes 33 formed in a flanged portion 32 of the second shaft 24, wherein the multiple pin holes 33 are arranged at equal intervals in a circumferential direction of the flanged portion 32. More exactly, respective centers of the multiple pin holes 33 are located on the same circle. The flanged portion 32 is rotated together with the second shaft 24.

The transmission unit 23 further has multiple pins 34 formed in the external gear 11, wherein the multiple pins 34 are arranged at equal intervals in a circumferential direction of the external gear 11. In addition, each of the pins 34 is located on the same circle and loosely inserted into each of the pin holes 33. Each of the pins 34 is projected from the external gear 11 in an axial direction thereof. As a result of the loose engagement between the pins 34 and the pin holes 33, a rotation of the external gear 11 (more exactly, the rotation component of the self-rotational motion of the external gear 11) is transmitted to the second shaft 24.

According to the speed decreasing device 20 of the above structure, the external gear 11 as well as the eccentric portion 22 is rotated in the sun-and-planet motion, when a rotation of an electric motor (not shown) is inputted to the first shaft 21. In this operation, the speed of the self-rotational motion of the external gear 11 is decreased with respect to the rotation of the first shaft 21. The rotation transmitted to the second shaft 24 via the transmission unit 23 is outputted from the planetary gear train 10.

Now, characterizing portions of the planetary gear train 10 of the internal engagement type will be explained with reference to FIGS. 4 to 9.

In the present disclosure, a pitch circle of the external gear 11 is designated by a first pitch circle "Sp1", while a pitch circle of the internal gear 12 is designated by a second pitch circle "Sp2", Hereinafter, explanation is made with reference to transverse cross sections of the external and the internal gears 11 and 12, which are cross sections on a plane perpendicular to the center axis AX1. A center axis of the internal gear 12 coincides with the center axis AX1 of the first shaft 21.

Tooth Surface of External Gear

Figure 4:
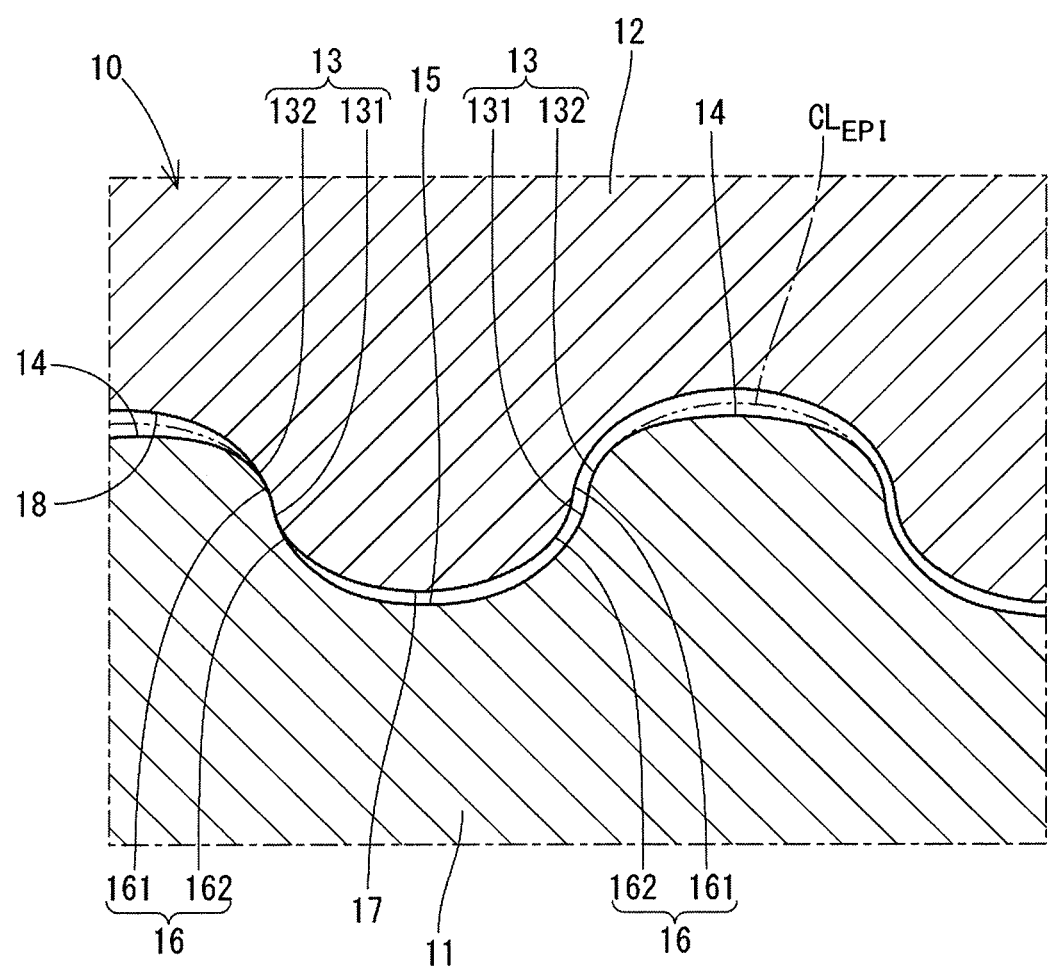
FIG. 4 is a schematically enlarged cross sectional view showing a portion IV of FIG. 3, that is, a portion of a teeth engagement area.
Figure 5:
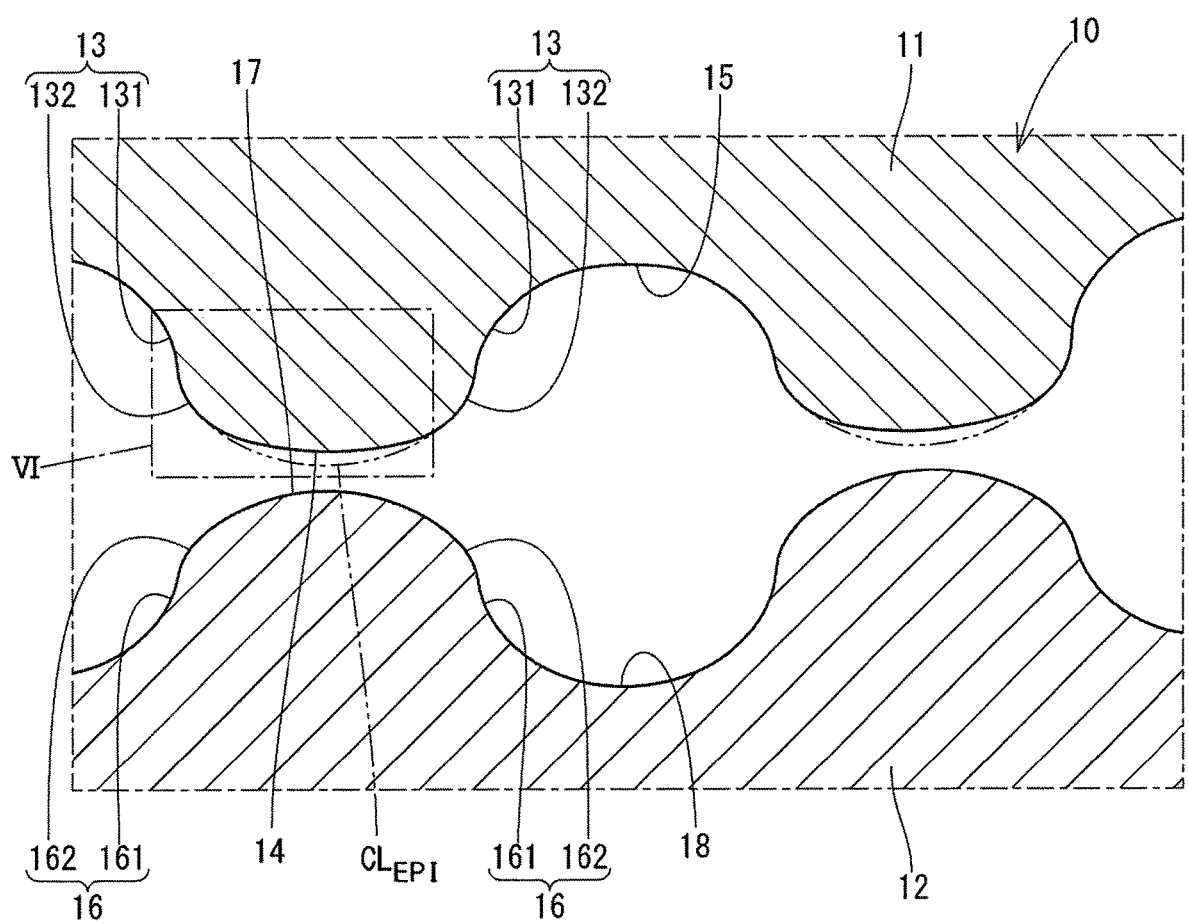
FIG. 5 is a schematically enlarged cross sectional view showing a portion V of FIG. 3, that is, a portion of a teeth non-engagement area.

As shown in FIGS. 4 and 5, the external gear 11 has multiple gear teeth formed at an outer periphery thereof and each gear tooth of the external gear 11 has an external contact surface 13, an external tooth-front surface 14 and an external tooth-bottom surface 15.

Figure 3:
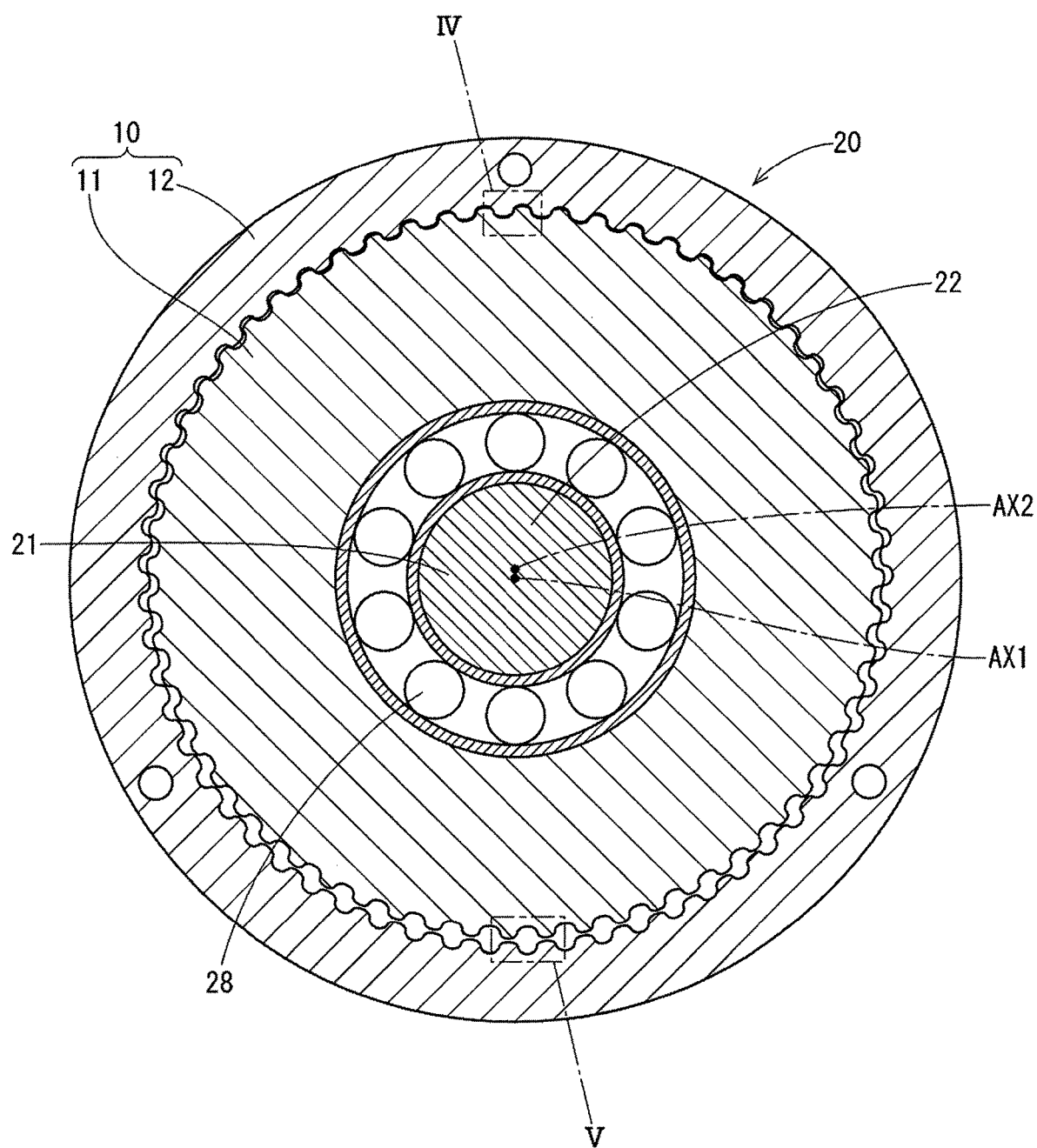
FIG. 3 is a schematic cross sectional view taken along a line III-III in FIG. 1.

The external contact surface 13 is a surface portion of the gear tooth, which is operatively brought into contact with the internal gear 12 when the external gear 11 is engaged with the internal gear 12 in a teeth engagement area (for example, an upper-side half area in FIG. 3). The external contact surface 13 includes an external bottom-side contact surface 131 and an external front-side contact surface 132. The external bottom-side contact surface 131 is a surface portion, which is located at a position inside of the first pitch circle "Sp1" of the external gear 11, that is, a radial-inside position closer to a tooth-bottom portion formed by the external tooth-bottom surface 15. The external front-side contact surface 132 is a surface portion, which is located at a position outside of the first pitch circle "Sp1" of the external gear 11, that is, a radial-outside position closer to a tooth-front portion formed by the external tooth-front surface 14.

The external tooth-front surface 14 is a surface portion of the gear tooth, which is located at the radial-outside position of the external contact surface 13 and which is continuously connected to the external contact surface 13. The external tooth-front surface 14 is the surface portion, which is not brought into contact with the internal gear 12 even when the external gear 11 is engaged with the internal gear 12 in the teeth engagement area.

The external tooth-bottom surface 15 is a surface portion of the gear tooth, which is located at the radial-inside position of the external contact surface 13 and which is continuously connected to the external contact surface 13. The external tooth-bottom surface 15 is the surface portion, which is not brought into contact with the internal gear 12 even when the external gear 11 is engaged with the internal gear 12 in the teeth engagement area.

Tooth Surface of Internal Gear

The internal gear 12 has multiple gear teeth formed at an inner periphery thereof and each of the gear teeth of the internal gear 12 has an internal contact surface 16, an internal tooth-front surface 17 and an internal tooth-bottom surface 18.

The internal contact surface 16 is a surface portion of the gear tooth, which is operatively brought into contact with the external gear 11 when the internal gear 12 is engaged with the external gear 11 in the teeth engagement area. The internal contact surface 16 includes an internal bottom-side contact surface 161 and an internal front-side contact surface 162. The internal bottom-side contact surface 161 is a surface portion, which is located at a position outside of the second pitch circle "Sp2" of the internal gear 12, that is, a radial-outside position closer to a tooth-bottom portion formed by the internal tooth-bottom surface 18. The internal front-side contact surface 162 is a surface portion, which is located at a position inside of the second pitch circle "Sp2" of the internal gear 12, that is, a radial-inside position closer to a tooth-front portion formed by the internal tooth-front surface 17.

The internal tooth-front surface 17 is a surface portion of the gear tooth, which is located at the radial-inside position of the internal contact surface 16 and which is continuously connected to the internal contact surface 16. The internal tooth-front surface 17 is the surface portion, which is not brought into contact with the external gear 11 even when the internal gear 12 is engaged with the external gear 11 in the teeth engagement area.

The internal tooth-bottom surface 18 is a surface portion of the gear tooth, which is located at the radial-outside position of the internal contact surface 16 and which is continuously connected to the internal contact surface 16. The internal tooth-bottom surface 18 is the surface portion, which is not brought into contact with the external gear 11 even when the internal gear 12 is engaged with the external gear 11 in the teeth engagement area.

Transverse Cross-Sectional Shape of Tooth Surface

Each of the external bottom-side contact surface 131 and the external tooth-bottom surface 15 has a transverse cross-sectional shape formed by a hypocycloid curved line.

The external front-side contact surface 132 has a transverse cross-sectional shape formed by an epicycloid curved line.

Each of the internal front-side contact surface 162 and the internal tooth-front surface 17 has a transverse cross-sectional shape formed by the hypocycloid curved line.

Each of the internal bottom-side contact surface 161 and the internal tooth-bottom surface 18 has a transverse cross-sectional shape formed by the epicycloid curved line.

External Tooth-Front Surface

In FIG. 5, which shows the external gear 11 and the internal gear 12 in a teeth non-engagement area (for example, a lower-side half area in FIG. 3) of the present embodiment, an external tooth-front surface of a comparison example is indicated by a two-dot-chain line. More exactly, in the comparison example, a reference external gear tooth has the external tooth-front surface formed by a reference epicycloid curved line "$CL_{EPI}$" indicated by the two-dot-chain line. The reference epicycloid curved line "$CL_{EPI}$" is a curved line, which is continuously connected to the transverse cross-sectional shape of the external front-side contact surface 132. In other words, the reference epicycloid curved line "$CL_{EPI}$" is the curved line, which is a part of the epicycloid curved line extending from the external contact surface 13 in a radial-outward direction to the tooth-front portion.

In a case of the comparison example, in which the reference external gear tooth indicated by the two-dot-chain line is used, the external gear 11 is not theoretically brought into contact with the internal gear 12 in the teeth non-engagement area, as shown in FIG. 5, if each dimension of the parts and components of the speed decreasing device 20 is exactly made to be a design value and there is no clearance in a radial direction among the respective parts and components.

However, in reality, the dimension of each part and/or component of the speed decreasing device 20 varies in a range of tolerance. In addition, there exists the clearance in the radial direction among the above parts and/or components. Although not shown in FIG. 3, there is the clearance between the eccentric portion 22 and an inner race of the bearing 28. As a result, the external gear 11 is possibly located at a position, which is closer to the internal gear 12 in the teeth non-engagement area than the position shown in FIG. 5, that is, a position to which the external gear 11 is moved in a downward direction in FIG. 5. In such a case, the tooth-front portion of the external gear 11 would be brought into contact with the tooth-front portion of the internal gear 12 in the teeth non-engagement area.

According to the present embodiment, however, the external tooth-front surface 14 is located at the position closer to the first pitch circle Sp1 in a radial-inward direction from the reference epicycloid curved line "$CL_{EPI}$". In other words, a run-out portion (a cut-away portion) is formed at the external tooth-front surface 14, more exactly, at the radial-inside position of the reference epicycloid curved line "$CL_{EPI}$". Hereinafter, a curved line formed by the transverse cross sectional shape of the external tooth-front surface 14 is referred to as "an external tooth-front curved line".

Figure 6:
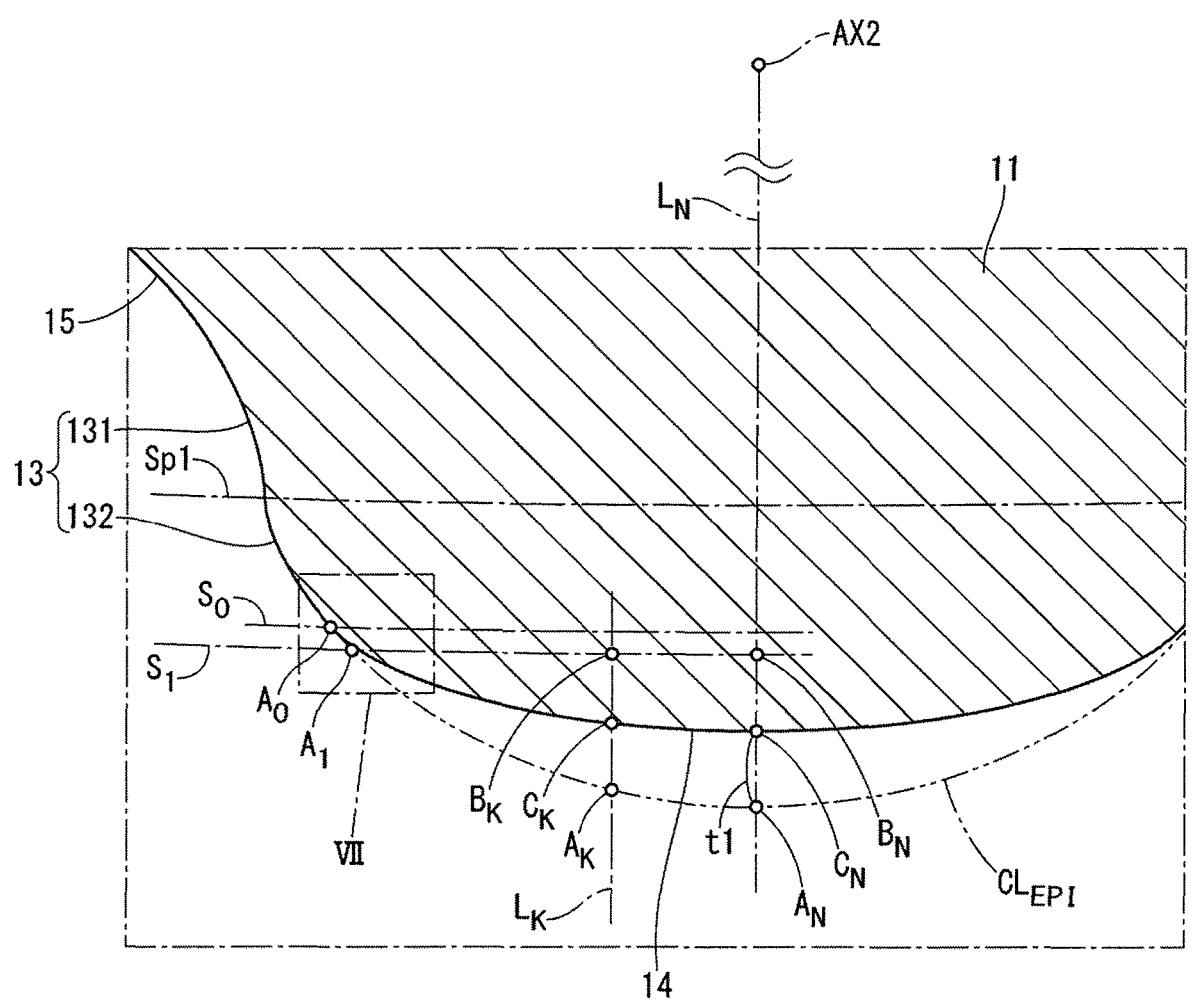
FIG. 6 is a schematically enlarged cross sectional view showing a portion VI of FIG. 5, that is, a gear tooth of an external gear.
Figure 7:
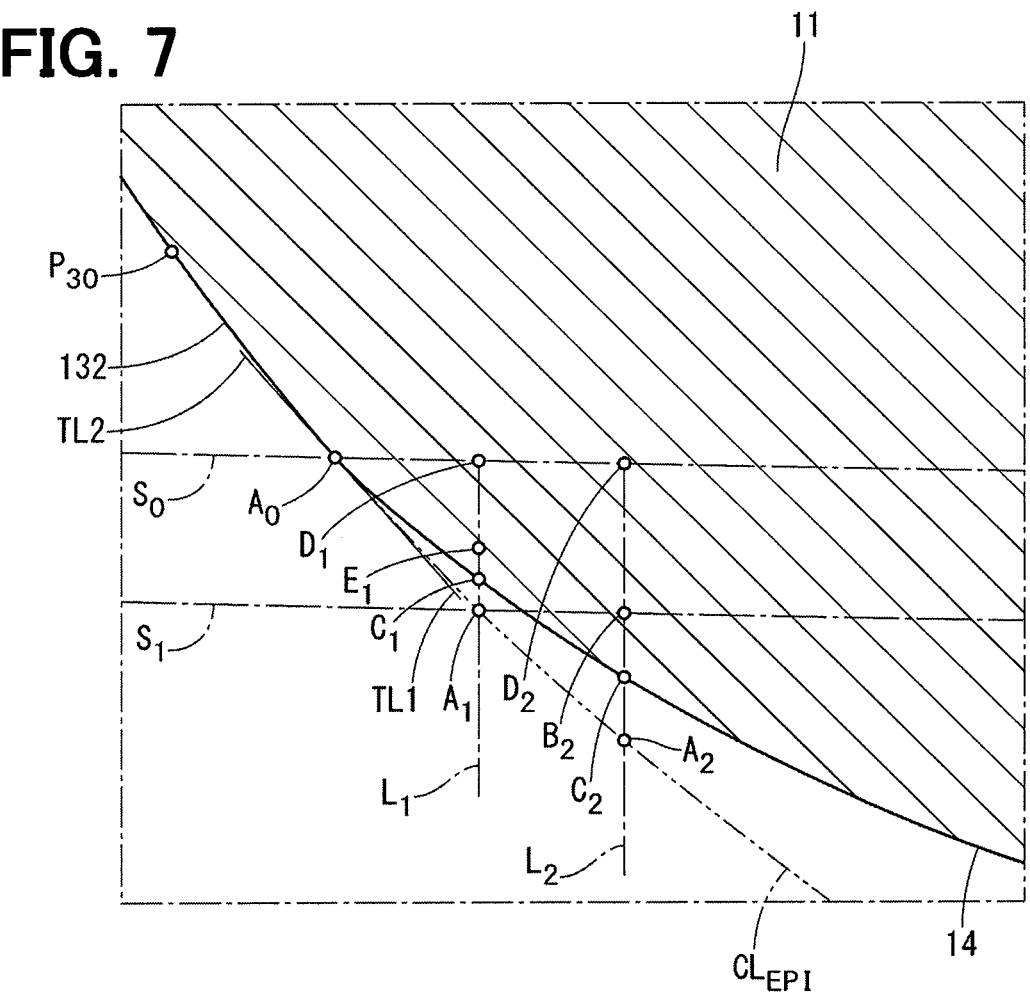
FIG. 7 is a further schematically enlarged cross sectional view showing a portion VII of FIG. 6.

The external tooth-front curved line will be further explained. In FIGS. 6 and 7, each showing the transverse cross sectional shape for the external gear tooth of the external gear 11, respective reference signs are defined as below:

(1-1) "$A_0$" is a connecting point of the external gear tooth, at which the external tooth-front surface 14 is continuously connected to the external contact surface 13 (hereinafter, the connecting point "$A_0$");

(1-2) "$A_N$" is a most-front point, which is located at a most-outside position of the reference epicycloid curved line "$CL_{EPI}$" in the radial-outward direction (hereinafter, the reference most-front point "$A_N$");

(1-3) "t1" is a first run-out amount, which corresponds to a distance between the reference most-front point "$A_N$" and a most-front point (equal to a run-out point "$C_N$" explained below) of the external tooth-front surface 14 (hereinafter, the first run-out amount "t1");

(1-4) "$A_1$" to "$A_{N-1}$" are points of division, each of which corresponds to respective points of division when the reference epicycloid curved line "$CL_{EPI}$" between the connecting point "$A_0$" and the reference most-front point "$A_N$" is equally divided into N-number portions along the reference epicycloid curved line "$CL_{EPI}$", wherein the points of division are located in a direction from the connecting point "$A_0$" to the reference most-front point "$A_N$" (hereinafter, the division point "$A_1$" to the division point "$A_{N-1}$");

(1-5) "$S_0$" is a circle, which is concentrically located with the first pitch circle "Sp1" and passes over the connecting point "$A_0$" (hereinafter, the first circle "$S_0$");

(1-6) "$S_1$" is a circle, which is concentrically located with the first pitch circle "Sp1" and passes over the division point "$A_1$" (hereinafter, the second circle "$S_1$");

(1-7) "$L_N$" is a straight line, which connects the reference most-front point "$A_N$" to the eccentric center axis "AX2" corresponding to the center of the first pitch circle "Sp1" (hereinafter, the central straight line "$L_N$");

(1-8) "$L_1$" to "$L_{N-1}$" are straight lines, each of which is parallel to the central straight line "$L_N$" and passes over the respective division points "$A_1$" to "$A_{N-1}$" (hereinafter, the straight lines "$L_1$" to "$L_{N-1}$");

(1-9) "$B_2$" to "$B_N$" are intersection points, at each of which the second circle "$S_1$" intersects with the respective straight lines "$L_2$" to "$L_N$" (hereinafter, the intersection points "$B_2$" to "$B_N$");

(1-10) "$C_N$" is the run-out point, which is the most-front point of the external tooth-front surface 14 and which corresponds to a point when the reference most-front point "$A_N$" is moved by the first run-out amount "t1" in the radial-inward direction to the intersection point "$B_N$" along the central straight line "$L_N$" (hereinafter, the central run-out point "$C_N$");

(1-11) "K" is an integral number from "2 (two)" to "N−1" (hereinafter, the integral number "K");

(1-12) "$C_K$" is a run-out point, which is located on the straight line "$L_K$" and satisfies the following condition

[a line segment "$A_K C_K$": a line segment "$C_K B_K$"=a line segment "$A_N C_N$": a line segment "$C_N B_N$"]

(hereinafter, the run-out point "$C_K$");

(1-13) "$D_2$" is an intersection point between the straight line "$L_2$" and the first circle "$S_0$" (hereinafter, the intersection point "$D_2$");

(1-14) "$D_1$" is an intersection point between the straight line "$L_1$" and the first circle "$S_0$" (hereinafter, the intersection point "$D_1$");

(1-15) "$E_1$" is a transfer point, which is located on the straight line "$L_1$" and satisfies the following condition

[a line segment "$A_1E_1$": a line segment "$E_1D_1$"=a line segment "$A_2C_2$": a line segment "$C_2D_2$"]

(hereinafter, the transfer point "$E_1$"); and (1-16) "$C_1$" is a run-out point, which is a middle point between the division point "$A_1$" and the transfer point "$E_1$".

The division number "N" is properly selected from numbers from 10 to 50. A ratio of the line segment (that is, the line segment "$A_NC_N$": the line segment "$C_NB_N$") is properly selected from a range of ratio between "1:9" and "3:2". In the present embodiment, the division number "N" is decided as "50" and the ratio of the line segment "$A_NC_N:C_NB_N$" is decided as "1:1".

The external tooth-front curved line of the external tooth-front surface 14 is an interpolation curved line, which passes over the connecting point "$A_0$" and the run-out points "$C_1$" to "$C_N$" respectively defined by the above definitions (1-1) to (1-16). For example, a spline curved line is used for the interpolation curved line.

Connecting Point of External Tooth-Front Surface

The external contact surface 13 is operatively brought into contact with the internal gear 12 in each of surface points from its bottom-side end to its front-side end (that is, to the connecting point "$A_0$") in the teeth engagement area. In other words, the connecting point "$A_0$" is formed at a position of the tooth surface of the external gear 11, at which the external gear 11 is in contact with the internal gear 12 in the teeth engagement area.

In a case that the position of the connecting point "$A_0$" becomes closer to the tooth-bottom portion of the external gear 11, a length of the external contact surface 13 (that is, a contact surface length between the external gear 11 and the internal gear 12 in the teeth engagement area) becomes correspondingly shorter. Durability of the gear tooth is thereby decreased. On the other hand, when the position of the connecting point "$A_0$" becomes too much closer to the tooth-front portion of the external gear 11, the tooth-front portion of the external gear 11 is possibly brought into contact with the tooth-front portion of the internal gear 12 in the teeth non-engagement area. Then, efficiency of torque transmission is decreased.

In the present embodiment, the above problem is taken into consideration when deciding the position of the connecting point "$A_0$". More exactly, the connecting point "$A_0$" of the present embodiment is located at such a position that the length of the external contact surface 13 in the transverse cross section becomes equal to or larger than 20% (twenty percent) of a total surface length of the tooth surface of the external gear 11 in the transverse cross section.

In addition, the connecting point "$A_0$" between the external contact surface 13 and the external tooth-front surface 14 is located at a position, which is closer to the tooth-front portion of the external gear 11 than a reference pressure-angel point "$P_{30}$" at which a pressure angle of the tooth surface is 30° (thirty degrees). The pressure angle is an angle formed between a radial line of the external gear 11 (or the internal gear 12) and a tangent line at a surface point of the tooth surface (for example, at the reference pressure-angle point "$P_{30}$").

Figure 8:
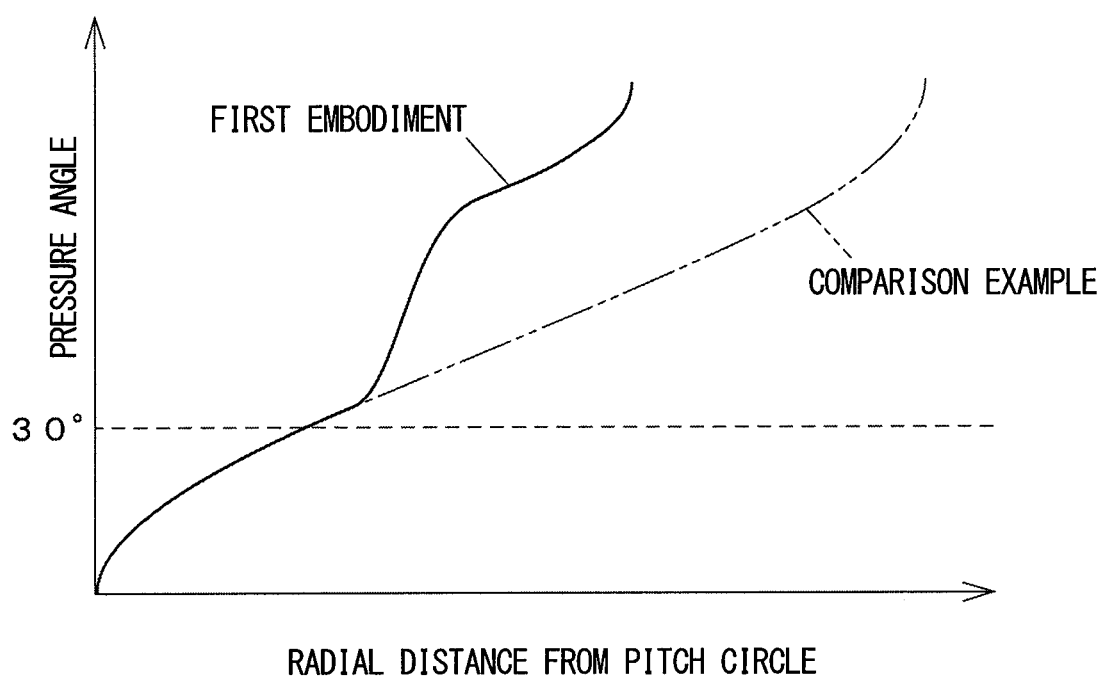
FIG. 8 is a graph showing a relationship of a pressure angle with respect to a radial distance from a pitch circle of the external gear of FIG. 3.
Figure 9:
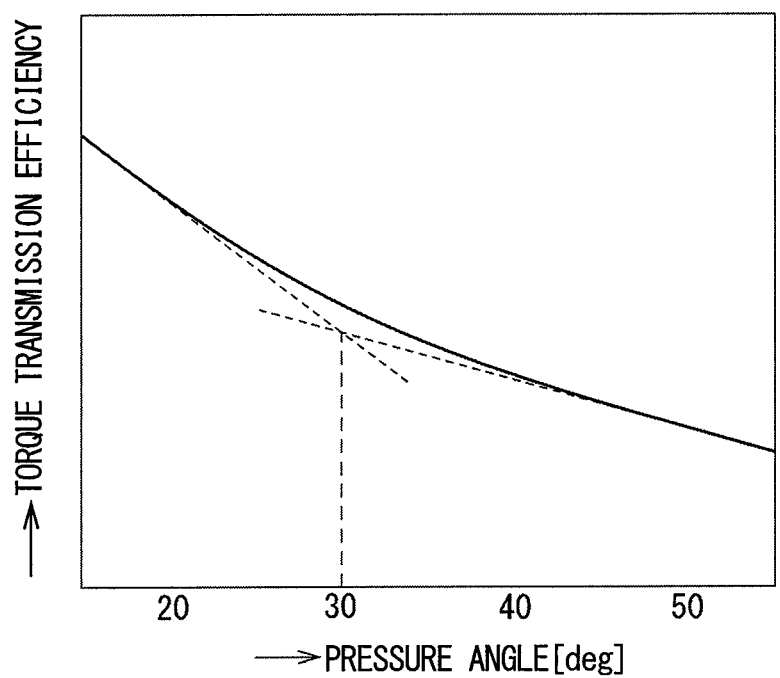
FIG. 9 is a graph showing a relationship of a torque transmission efficiency with respect to the pressure angle of the external gear of FIG. 3.

According to such a structure (the position of the connecting point "$A_0$"), the following advantage can be obtained. As shown in FIG. 9, the efficiency of the torque transmission becomes lower when the pressure angle becomes larger than 30°. FIG. 8 shows the pressure angle with respect to a distance in the radial direction from the pitch circle. In FIG. 8, a solid line shows the pressure angle of the present embodiment, while a two-dot-chain line shows the pressure angle of the comparison example in which the external tooth-front surface 14 is formed by the reference epicycloid curved line "$CL_{EPI}$". As shown in FIG. 8, in an area above the pressure angle of 30°, the pressure angle of the present embodiment is larger than that of the comparison example, since the tooth surface shape in the transverse cross section of the present embodiment is different from the epicycloid curved line, more exactly, the external tooth-front curved line is located at the radial-inside position of the reference epicycloid curved line "$CL_{EPI}$". However, in an area below the pressure angle of 30°, the pressure angle of the present embodiment becomes equal to that of the comparison example, because the tooth surface shape in the transverse cross section of the present embodiment is formed by the epicycloid curved line at the external front-side contact surface 132. Therefore, the torque transmission can be carried out by an ideal surface contact between the external gear 11 and the internal gear 12 in the area below the pressure angle of 30°, in which the efficiency of the torque transmission is relatively high, as shown in FIG. 9.

As shown in FIG. 7, a tangent line "TL1" of the external tooth-front surface 14 at the connecting point "$A_0$" coincides with a tangent line "TL2" of the external front-side contact surface 132 at the connecting point "$A_0$". In the present embodiment, a portion of the external tooth-front surface 14 between the connecting point "$A_0$" and the run-out point "$C_1$", that is, an end portion of the external tooth-front curved line connected to the external front-side contact surface 132, is formed by a circular arc line in its transverse cross section.

Advantages of First Embodiment

As explained above, in the present embodiment, each of the external bottom-side contact surface 131 and the external tooth-bottom surface 15 has the transverse cross-sectional shape formed by the hypocycloid curved line. The external front-side contact surface 132 has the transverse cross-sectional shape formed by the epicycloid curved line. Each of the internal front-side contact surface 162 and the internal tooth-front surface 17 has the transverse cross-sectional shape formed by the hypocycloid curved line. Each of the internal bottom-side contact surface 161 and the internal tooth-bottom surface 18 has the transverse cross-sectional shape formed by the epicycloid curved line.

In addition, the external tooth-front surface 14 is located at the position closer to the first pitch circle Sp1 in the radial-inward direction from the reference epicycloid curved line "$CL_{EPI}$". The run-out portion is thereby formed at the external tooth-front surface 14 so as to avoid such a situation that the tooth-front portion of the external gear 11 is possibly brought into contact with the tooth-front portion of the internal gear 12 in the teeth non-engagement area. As a result, friction loss which may be caused by a possible contact between the external gear 11 and the internal gear 12 in the teeth non-engagement area can be decreased. It is therefore possible to prevent a decrease of the efficiency of the torque transmission.

Furthermore, in the present embodiment, the connecting point "$A_0$" is located at the position so that the contact surface length of the external contact surface 13 in the transverse cross section becomes equal to or larger than 20%

(twenty percent) of the total surface length of the tooth surface of the external gear 11 in the transverse cross section.

The run-out portion is thereby formed in such a way that the contact surface length between the external gear 11 and the internal gear 12 in the teeth engagement area becomes equal to or larger than 20% (twenty percent) of the total surface length of the tooth surface of the external gear 11. It is therefore possible to prevent a decrease of durability, which would be caused by the decrease of the contact surface length between the external gear 11 and the internal gear 12.

In addition, the connecting point "$A_0$" between the external contact surface 13 and the external tooth-front surface 14 is located at the position, which is closer to the tooth-front portion of the external gear 11 than the reference pressure-angel point "$P_{30}$" at which the pressure angle of the tooth surface is 30° (thirty degrees).

In the area in which the pressure angle is smaller than 30°, the efficiency of the torque transmission becomes relatively high (FIG. 9) and the tooth surface of the external gear 11 in the transverse cross section coincides with the epicycloid curved line at the external front-side contact surface 132. As a result, the external gear 11 and the internal gear 12 are engaged with each other in the ideal surface contact condition in the area in which the efficiency of the torque transmission is relatively high. Accordingly, the torque is effectively transmitted from the external gear 11 to the internal gear 12.

In addition, in the present embodiment, the tangent line "TL1" of the external tooth-front surface 14 at the connecting point "$A_0$" coincides with the tangent line "TL2" of the external front-side contact surface 132 at the connecting point "$A_0$". According to the above structure, a corner is not formed at the connecting point "$A_0$". In other words, the external tooth-front surface 14 is smoothly and continuously connected to the external front-side contact surface 132 at the connecting point "$A_0$". As a result, it is possible to prevent sectional abrasion of the tooth surface of the internal gear 12 when the external gear 11 and the internal gear 12 are engaged with each other.

In addition, in the present embodiment, the portion of the external tooth-front surface 14, which is connected to the external front-side contact surface 132, is formed by the circular arc line in its transverse cross section. According to the above structure, the corner is not formed in the end portion of the external tooth-front curved line (which is connected to the external contact surface 13 at the connecting point "$A_0$"), either. Therefore, it is possible to prevent the sectional abrasion of the tooth surface of the internal gear 12 when the external gear 11 and the internal gear 12 are engaged with each other.

Modification of First Embodiment

The above definition (1-4) for the division points "$A_1$" to "$A_{N-1}$" may be modified in the following manner.

(1-4: modified) "$A_1$" to "$A_{N-1}$" are points of division, each of which corresponds to respective points of division when the reference epicycloid curved line "$CL_{EPI}$" between the connecting point "$A_0$" and the reference most-front point "$A_N$" is divided into N-number portions at equal angles around the center of the first pitch circle "Sp1", wherein the points of division are located in a direction from the connecting point "$A_0$" to the reference most-front point "$A_N$" (hereinafter, the division point "$A_1$" to the division point "$A_{N-1}$").

Second Embodiment

Characterizing portions of the planetary gear train 10 of the internal engagement type according to a second embodiment of the present disclosure will be explained with reference to FIGS. 10 to 14.

Cross-Sectional Shape of Tooth Surface

Figure 10:
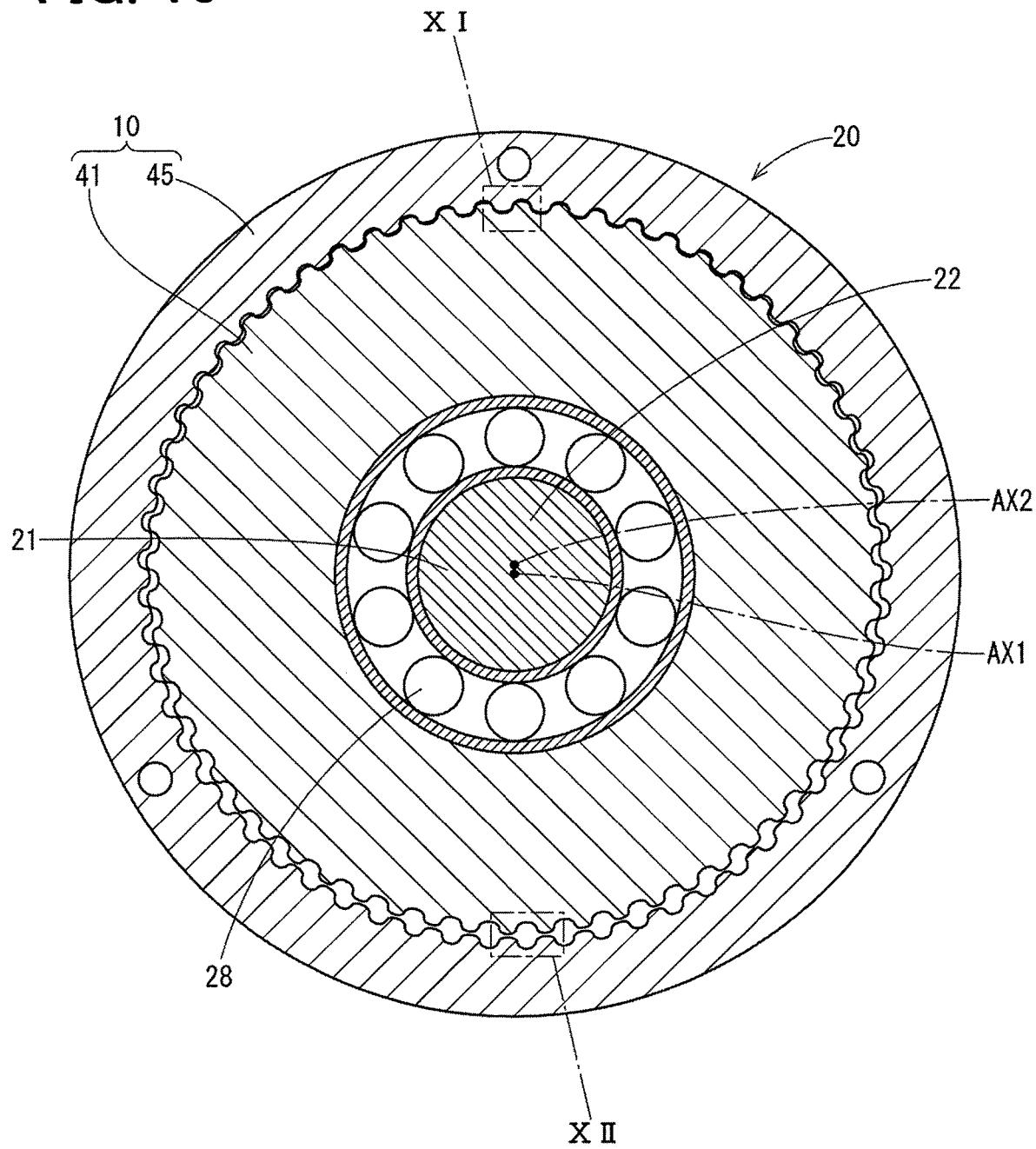
FIG. 10 is a schematic cross sectional view showing the planetary gear train of the internal engagement type according to a second embodiment of the present disclosure.
Figure 11:
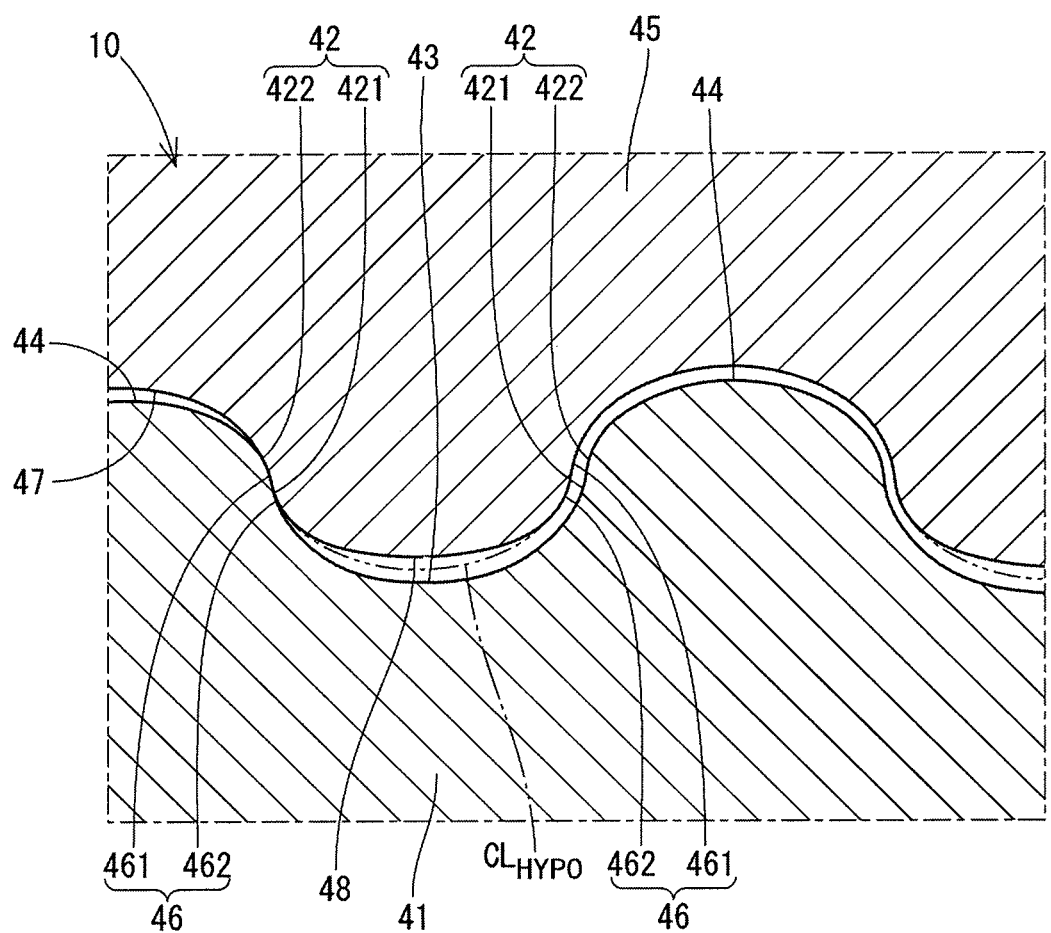
FIG. 11 is a schematically enlarged cross sectional view showing a portion XI of FIG. 10 (a portion of the teeth engagement area)
Figure 12:
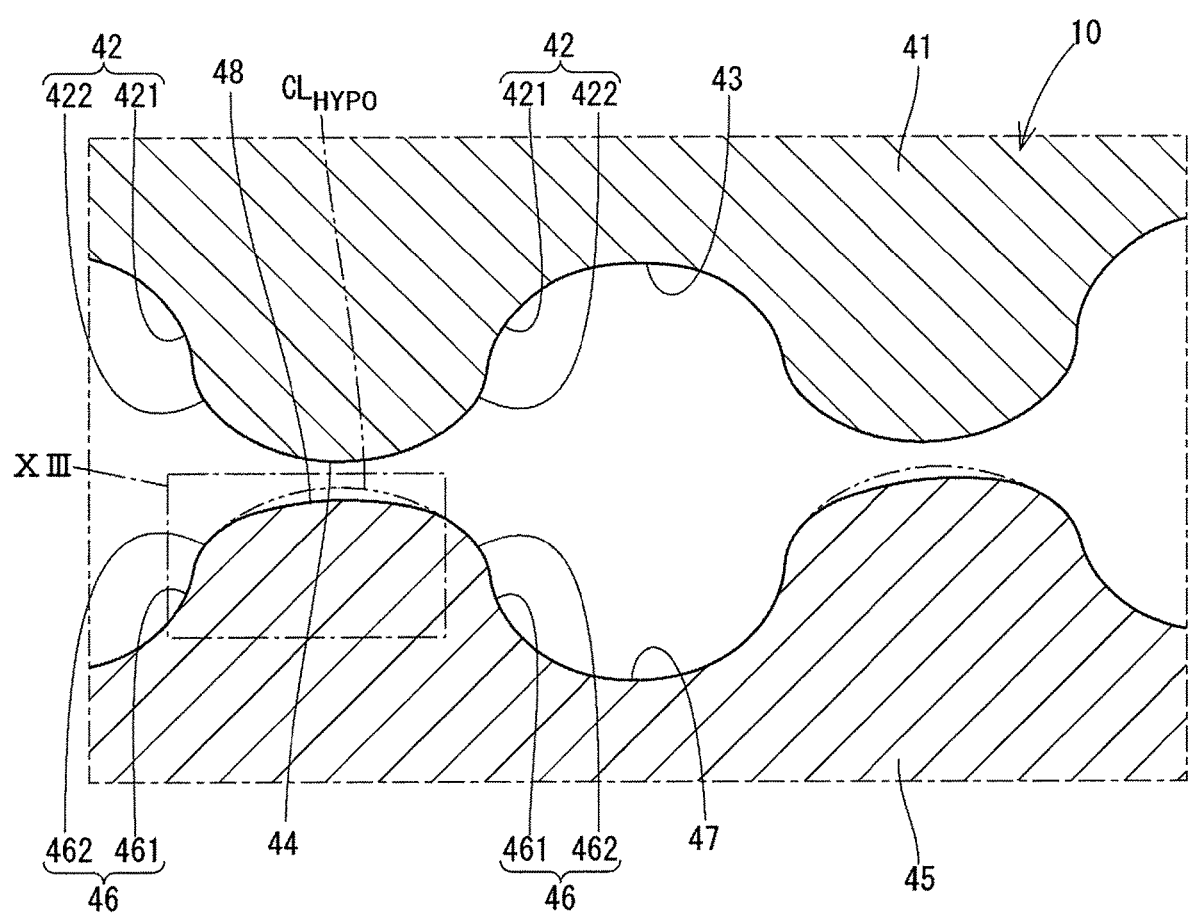
FIG. 12 is a schematically enlarged cross sectional view showing a portion XII of FIG. 10 (a portion of the teeth non-engagement area)

As shown in FIGS. 10 to 12, a tooth surface of an external gear 41 is composed of an external contact surface 42, an external tooth-bottom surface 43 and an external tooth-front surface 44. The external contact surface 42 includes an external bottom-side contact surface 421 and an external front-side contact surface 422. Each of the external bottom-side contact surface 421 and the external tooth-bottom surface 43 has a transverse cross-sectional shape formed by the hypocycloid curved line. Each of the external front-side contact surface 422 and the external tooth-front surface 44 has a transverse cross-sectional shape formed by the epicycloid curved line.

A tooth surface of an internal gear 45 is composed of an internal contact surface 46, an internal tooth-bottom surface 47 and an internal tooth-front surface 48. The internal contact surface 46 includes an internal bottom-side contact surface 461 and an internal front-side contact surface 462. The internal front-side contact surface 462 has a transverse cross-sectional shape formed by the hypocycloid curved line. Each of the internal bottom-side contact surface 461 and the internal tooth-bottom surface 47 has a transverse cross-sectional shape formed by the epicycloid curved line.

Tooth-Front Surface of Internal Gear

In FIG. 12, a reference hypocycloid curved line "$CL_{HYPO}$" is indicated by a two-dot-chain line. The reference hypocycloid curved line "$CL_{HYPO}$" is a curved line continuously connected to the internal front-side contact surface 462. In other words, the reference hypocycloid curved line "$CL_{HYPO}$" is the curved line, which extends in the radial-inward direction from the hypocycloid curved line for the internal front-side contact surface 462 to a tooth-front portion formed by the internal tooth-front surface 48 of the internal gear 45.

In the present embodiment, the internal tooth-front surface 48 is located at a position closer to the second pitch circle "Sp2" in the radial-outward direction from the reference hypocycloid curved line "$CL_{HYPO}$". In other words, a runout portion is formed at the internal tooth-front surface 48, more exactly, at a radial-outside position of the reference hypocycloid curved line "$CL_{HYPO}$". Hereinafter, a curved line formed by the transverse cross sectional shape of the internal tooth-front surface 48 is referred to as "an internal tooth-front curved line".

Figure 13:
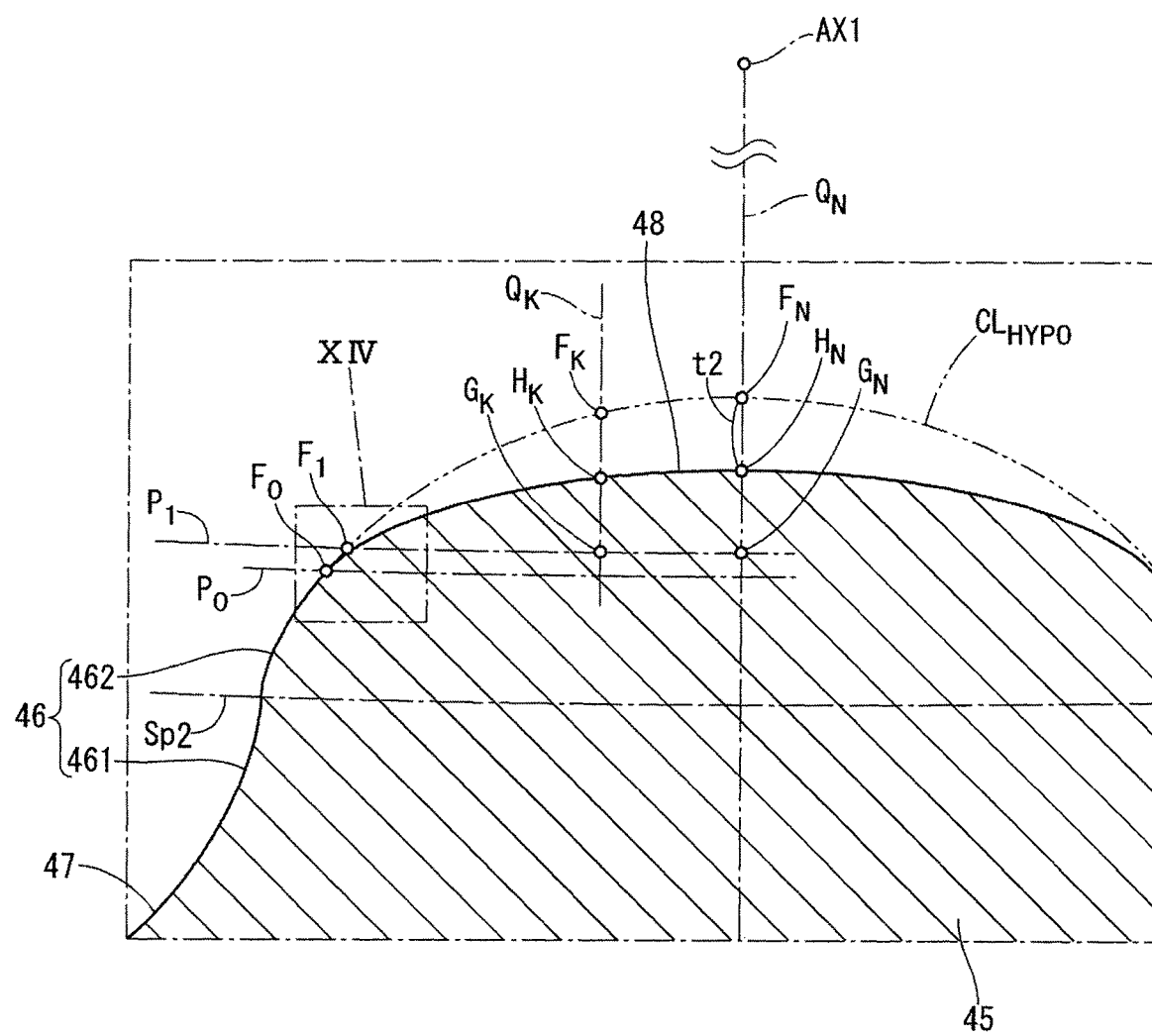
FIG. 13 is a schematically enlarged cross sectional view showing a portion XIII of FIG. 12 (a gear tooth of an internal gear)
Figure 14:
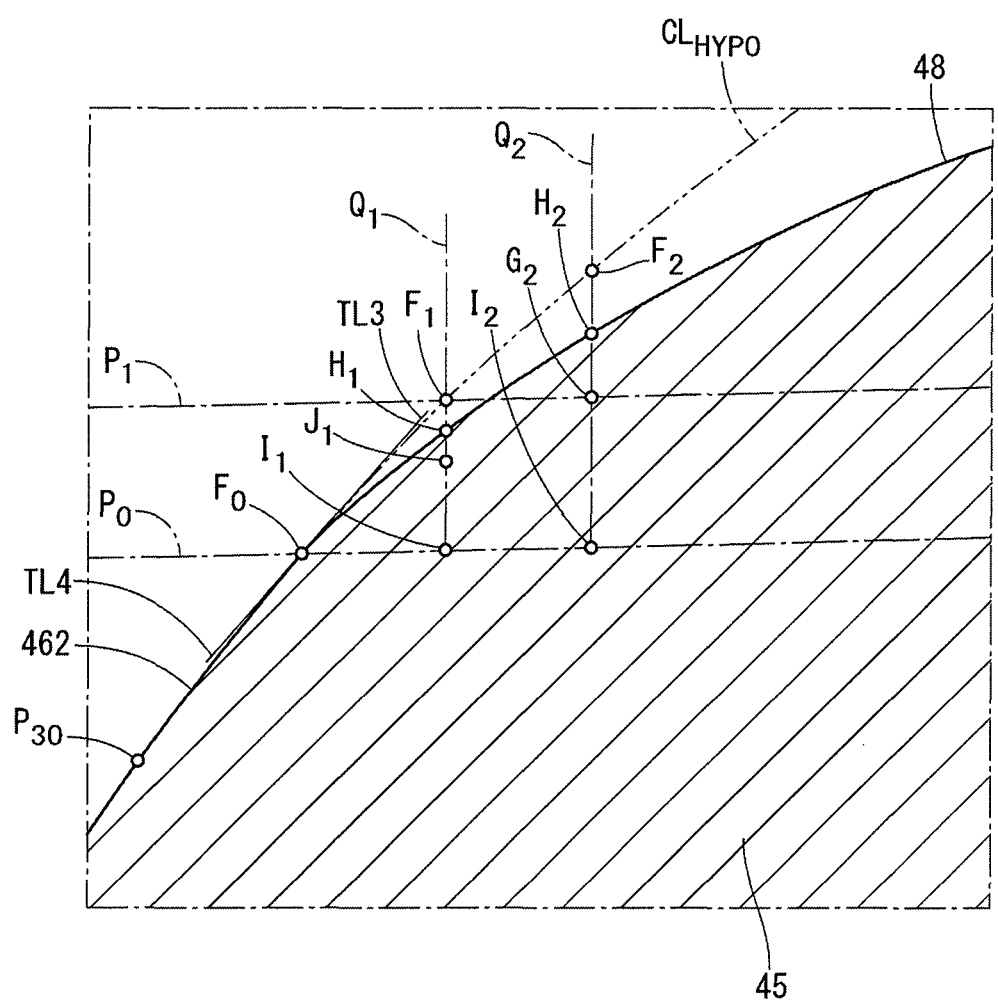
FIG. 14 is a further schematically enlarged cross sectional view showing a portion XIV of FIG. 13.

The internal tooth-front curved line will be further explained. In FIGS. 13 and 14, each showing the transverse cross sectional shape for the internal gear tooth of the internal gear 45, respective reference signs are defined as below:

(2-1) "$F_0$" is a connecting point of the internal gear tooth, at which the internal tooth-front surface 48 is continuously connected to the internal contact surface 46 (hereinafter, the connecting point "$F_0$");

(2-2) "$F_N$" is a most-front point, which is located at a most-inside position of the reference hypocycloid curved line "$CL_{HYPO}$" in the radial-inward direction (hereinafter, the reference most-front point "$F_N$");

(2-3) "t2" is a second run-out amount, which corresponds to a distance between the reference most-front point "$F_N$" and a most-front point (equal to a run-out point "$H_N$" explained below) of the internal tooth-front surface 48 (hereinafter, the second run-out amount "t2");

(2-4) "$F_1$" to "$F_{N-1}$" are points of division, each of which corresponds to respective points of division when the reference hypocycloid curved line "$CL_{HYPO}$" between the connecting point "$F_0$" and the reference most-front point "$F_N$" is equally divided into N-number portions along the reference hypocycloid curved line "$CL_{HYPO}$", wherein the points of division are located in a direction from the connecting point "$F_0$" to the reference most-front point "$F_N$" (hereinafter, the division point "$F_1$" to the division point "$F_{N-1}$");

(2-5) "$P_0$" is a circle, which is concentrically located with the second pitch circle "Sp2" and passes over the connecting point "$F_0$" (hereinafter, the first circle "$P_0$");

(2-6) "$P_1$" is a circle, which is concentrically located with the second pitch circle "Sp2" and passes over the division point "$F_1$" (hereinafter, the second circle "$P_1$");

(2-7) "$Q_N$" is a straight line, which connects the reference most-front point "$F_N$" to the center axis "AX1" corresponding to the center of the second pitch circle "Sp2" (hereinafter, the central straight line "$Q_N$");

(2-8) "$Q_1$" to "$Q_{N-1}$" are straight lines, each of which is parallel to the central straight line "$Q_N$" and passes over the respective division points "$F_1$" to "$F_{N-1}$" (hereinafter, the straight lines "$Q_1$" to "$Q_{N-1}$");

(2-9) "$G_2$" to "$G_N$" are intersection points, at each of which the second circle "$P_1$" intersects with the respective straight lines "$Q_2$" to "$Q_N$" (hereinafter, the intersection points "$G_2$" to "$G_N$");

(2-10) "$H_N$" is the run-out point, which is the most-front point of the internal tooth-front surface 48 and which corresponds to a point when the reference most-front point "$F_N$" is moved by the second run-out amount "t2" in the radial-outward direction to the intersection point "$G_N$" along the central straight line "$Q_N$" (hereinafter, the central run-out point "$H_N$");

(2-11) "K" is an integral number from "2 (two)" to "N−1" (hereinafter, the integral number "K");

(2-12) "$H_K$" is a run-out point, which is located on the straight line "$Q_K$" and satisfies the following condition

[a line segment "$F_K H_K$": a line segment "$H_K G_K$"=a line segment "$F_N H_N$": a line segment "$H_N G_N$"]

(hereinafter, the run-out point "$H_K$");

(2-13) "$I_2$" is an intersection point between the straight line "$Q_2$" and the first circle "$P_0$" (hereinafter, the intersection point "$I_2$");

(2-14) "$I_1$" is an intersection point between the straight line "$Q_1$" and the first circle "$P_0$" (hereinafter, the intersection point "$I_1$");

(2-15) "$J_1$" is a transfer point, which is located on the straight line "$Q_1$" and satisfies the following condition

[a line segment "$F_1 J_1$": a line segment "$J_1 I_1$"=a line segment "$F_2 H_2$": a line segment "$H_2 I_2$"]

(hereinafter, the transfer point "$J_1$"); and (2-16) "$H_1$" is a run-out point, which is a middle point between the division point "$F_1$" and the transfer point "$J_1$".

The division number "N" is properly selected from numbers from 10 to 50. A ratio of the line segment (that is, the line segment "$F_N H_N$": the line segment "$H_N G_N$") is properly selected from a range of ratio from "1:9" to "3:2". In the present embodiment, the division number "N" is decided as "50" and the ratio of the line segment "$F_N H_N$:$H_N G_N$" is decided as "1:1".

The transverse cross-sectional shape (that is, the internal tooth-front curved line) of the internal tooth-front surface 48 is an interpolation curved line, which passes over the connecting point "$F_0$" and the run-out points "$H_1$" to "$H_N$" respectively defined by the above definitions (2-1) to (2-16). For example, the spline curved line is used for the interpolation curved line.

Connecting Point of Internal Tooth-Front Surface

The internal contact surface 46 is brought into contact with the external gear 41 in each of surface points from its bottom-side end to its front-side end (that is, to the connecting point "$F_0$") in the teeth engagement area. In other words, the connecting point "$F_0$" is formed at a position of the tooth surface of the internal gear 45, at which the internal gear 45 is in contact with the external gear 41 in the teeth engagement area.

In a case that the position of the connecting point "$F_0$" becomes closer to the tooth-bottom portion of the internal gear 45, a length of the internal contact surface 46 (that is, a contact surface length between the internal gear 45 and the external gear 41 in the teeth engagement area) becomes correspondingly shorter. Durability of the gear tooth is thereby decreased. On the other hand, when the position of the connecting point "$F_0$" becomes too much closer to the tooth-front portion of the internal gear 45, the tooth-front portion of the internal gear 45 is possibly brought into contact with the tooth-front portion of the external gear 41 in the teeth non-engagement area. Then, the efficiency of torque transmission is decreased.

In the present embodiment, the above problem is taken into consideration when deciding the position of the connecting point "$F_0$". More exactly, the connecting point "$F_0$" of the present embodiment is located at such a position that the length of the internal contact surface 46 in the transverse cross section becomes equal to or larger than 20% (twenty percent) of a total surface length of the tooth surface of the internal gear 45 in the transverse cross section.

In addition, the connecting point "$F_0$" between the internal contact surface 46 and the internal tooth-front surface 48 is located at a position, which is closer to the tooth-front portion of the internal gear 45 than the reference pressure-angle point "$P_{30}$" at which the pressure angle of the tooth surface is 30° (thirty degrees).

In the same manner to the first embodiment, the efficiency of the torque transmission becomes relatively small when the pressure angle becomes larger than 30°. According to the above structure (the position of the connecting point "$F_0$"), the tooth surface shape in the transverse cross section is separated from the hypocycloid curved line of the two-dot-chain line, in the area in which the pressure angle is larger than 30°. However, in the area in which the pressure angle is smaller than 30°, the tooth surface shape in the transverse cross section coincides with the hypocycloid curved line. Therefore, the torque transmission can be carried out by the ideal surface contact between the external gear 41 and the internal gear 45 in the area below the pressure angle of 30°, in which the efficiency of the torque transmission is relatively high.

As shown in FIG. 14 a tangent line "TL3" of the internal tooth-front surface 48 at the connecting point "$F_0$" coincides with a tangent line "TL4" of the internal front-side contact surface 462 at the connecting point "$F_0$". In the present embodiment, a portion of the internal tooth-front surface 48 between the connecting point "$F_0$" and the run-out point "$H_1$", that is, an end portion of the internal tooth-front curved line connected to the internal front-side contact surface 462, is formed by a circular arc line in its transverse cross section.

Advantages of Second Embodiment

As explained above, in the present embodiment, each of the external bottom-side contact surface 421 and the external tooth-bottom surface 43 has the transverse cross-sectional shape formed by the hypocycloid curved line. Each of the external front-side contact surface 422 and the external tooth-front surface 44 has the transverse cross-sectional shape formed by the epicycloid curved line. The internal front-side contact surface 462 has the transverse cross-sectional shape formed by the hypocycloid curved line. Each of the internal bottom-side contact surface 461 and the internal tooth-bottom surface 47 has the transverse cross-sectional shape formed by the epicycloid curved line.

In addition, the internal tooth-front surface 48 is located at the position closer to the second pitch circle "Sp2" in the radial-outward direction from the reference hypocycloid curved line "$CL_{HYPO}$". The run-out portion is thereby formed at the internal tooth-front surface 48 so as to avoid the situation that the tooth-front portion of the internal gear 45 is possibly brought into contact with the tooth-front portion of the external gear 41 in the teeth non-engagement area. As a result, friction loss which may be caused by the possible contact between the external gear 41 and the internal gear 45 in the teeth non-engagement area can be decreased. It is therefore possible to prevent the decrease of the efficiency of the torque transmission.

Furthermore, in the present embodiment, the connecting point "$F_0$" is located at the position so that the contact surface length of the internal contact surface 46 in the transverse cross section becomes equal to or larger than 20% (twenty percent) of the total surface length of the tooth surface of the internal gear 45 in the transverse cross section. The run-out portion is thereby formed in such a way that the contact surface length between the external gear 41 and the internal gear 45 in the teeth engagement area becomes equal to or larger than 20% (twenty percent) of the total length of the tooth surface of the internal gear 45. It is therefore possible to prevent the decrease of durability, which would be caused by the decrease of the contact surface length between the external gear 41 and the internal gear 45.

In addition, the connecting point "$F_0$" between the internal contact surface 46 and the internal tooth-front surface 48 is located at the position, which is closer to the tooth-front portion of the internal gear 45 than the reference pressure-angle point "$P_{30}$" at which the pressure angle of the tooth surface is 30° (thirty degrees). In the area in which the pressure angle is smaller than 30°, the efficiency of the torque transmission becomes relatively high and the tooth surface of the internal gear 45 in the transverse cross section coincides with the hypocycloid curved line at the internal front-side contact surface 462. As a result, the external gear 41 and the internal gear 45 are engaged with each other in the ideal surface contact condition in the area in which the efficiency of the torque transmission is relatively high. Accordingly, the torque is effectively transmitted from the external gear 41 to the internal gear 45.

In addition, in the present embodiment, the tangent line "TL3" of the internal tooth-front surface 48 at the connecting point "$F_0$" coincides with the tangent line "TL4" of the internal front-side contact surface 462 at the connecting point "$F_0$". According to the above structure, a corner is not formed at the connecting point "$F_0$". In other words, the internal tooth-front surface 48 is smoothly and continuously connected to the internal front-side contact surface 462 at the connecting point "$F_0$". As a result, it is possible to prevent sectional abrasion of the tooth surface of the external gear 41 when the external gear 41 and the internal gear 45 are engaged with each other.

In addition, in the present embodiment, the portion of the internal tooth-front surface 48, which is connected to the internal front-side contact surface 462, is formed by the circular arc line in its transverse cross section. According to the above structure, the corner is not formed in the end portion of the internal tooth-front curved line (which is connected to the internal contact surface 46 at the connecting point "$F_0$"), either. Therefore, it is possible to prevent the sectional abrasion of the tooth surface of the external gear 41 when the external gear 41 and the internal gear 45 are engaged with each other.

Modification of Second Embodiment

The above definition (2-4) for the division points "$F_1$" to "$F_{N-1}$" may be modified in the following manner.

(2-4: modified) "$F_1$" to "$F_{N-1}$" are points of division, each of which corresponds to respective points of division when the reference hypocycloid curved line "$CL_{HYPO}$" between the connecting point "$F_0$" and the reference most-front point "$F_N$" is divided into N-number portions at equal angles around the center of the second pitch circle "Sp2", wherein the points of division are located in a direction from the connecting point "$F_0$" to the reference most-front point "$F_N$" (hereinafter, the division point "$F_1$" to the division point "$F_{N-1}$").

Third Embodiment

Characterizing portions of the planetary gear train 10 of the internal engagement type according to a third embodiment will be explained with reference to FIG. 15.

Figure 15:
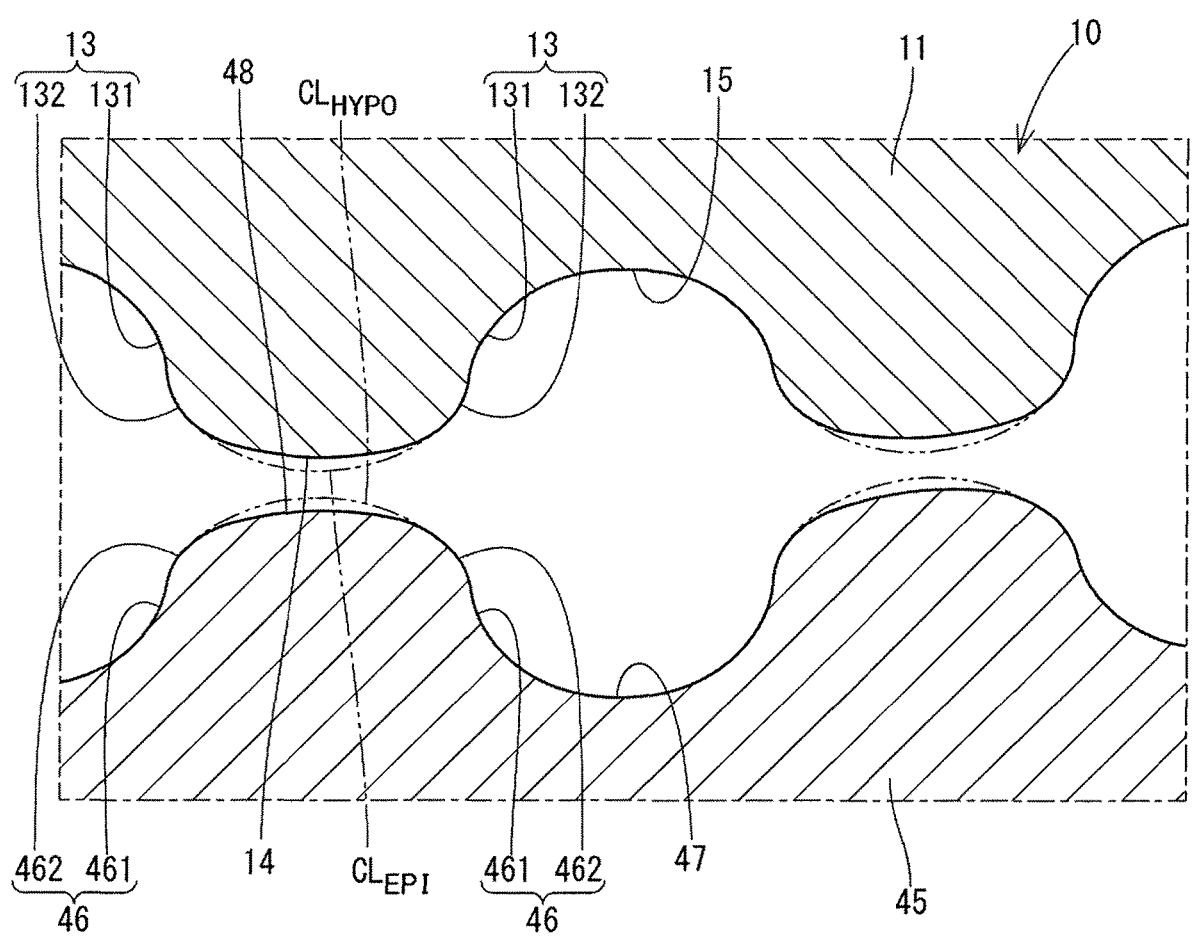
FIG. 15 is a schematically enlarged cross sectional view showing a portion (a portion of the teeth non-engagement area) of the planetary gear train of the internal engagement type according to a third embodiment of the present disclosure, wherein FIG. 15 corresponds to FIG. 5 of the first embodiment.

As shown in FIG. 15, in the same manner to the first embodiment, the run-out portion is formed in the external gear 11 in such a way that a portion of the external tooth-front surface 14 of the external gear 11 is escaped (cut away) in the radial-inward direction from the reference epicycloid curved line "$CL_{EPI}$". In addition, in the same manner to the second embodiment, the run-out portion is formed in the internal gear 45 in such a way that a portion of the internal tooth-front surface 48 of the internal gear 45 is escaped (cut away) in the radial-outward direction from the reference hypocycloid curved line "$CL_{HYPO}$". As a result, it is possible to prevent the decrease of the durability. Furthermore, since the friction loss which may be caused by the possible contact between the external gear 11 and the internal gear 45 in the teeth non-engagement area can be decreased, it is possible to prevent the decrease of the efficiency of the torque transmission.

Fourth Embodiment

Characterizing portions of the planetary gear train 10 of the internal engagement type according to a fourth embodiment will be explained with reference to FIG. 16.

Figure 16:
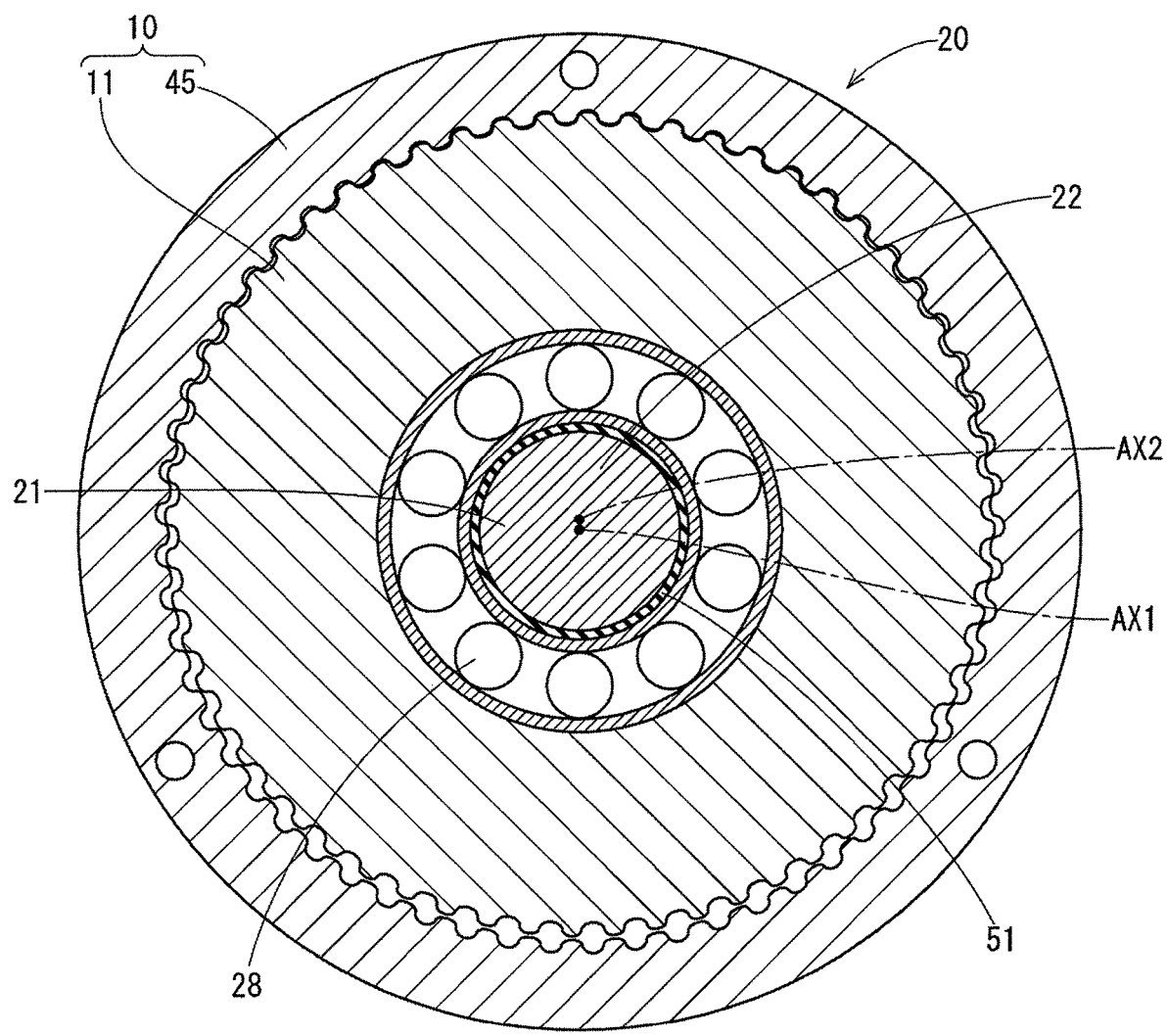
FIG. 16 is a schematically enlarged cross sectional view showing the planetary gear train of the internal engagement type according to a fourth embodiment of the present disclosure, wherein FIG. 16 corresponds to FIG. 3 of the first embodiment.

As shown in FIG. 16, a displacement preventing unit 51 is provided in the planetary gear train 10 of the internal engagement type in order to prevent not only a radial displacement of the external gear 11 with respect to the internal gear 45 in the radial direction but also an inclination of the center axis of the external gear 11. A relative displacement includes the radial displacement of the external gear 11 in the radial direction, the inclination of the center axis of the external gear 11 and a three-dimensional displacement, which is a combination of the radial displacement and the inclination of the center axis. The displacement preventing unit 51 is composed of a cylindrical member provided between the eccentric portion 22 and the bearing 28. The displacement preventing unit 51 in the present embodiment is made of elastic material, for example, rubber.

When the external gear 11 is displaced with respect to the internal gear 45, the pressure angle of the contacting teeth varies in the teeth engagement area. The displacement preventing unit 51 prevents the radial displacement between the external gear 11 and the internal gear 45 in the radial direction so that the pressure angle of the contacting teeth in the teeth engagement area is maintained at a value smaller than 30°.

According to the fourth embodiment, therefore, the external gear 11 and the internal gear 45 are engaged with each other under the ideal surface contact condition in the area in which the efficiency of the torque transmission is relatively high. The torque can be effectively transmitted between the external gear 11 and the internal gear 45.

Modification of Fourth Embodiment

Figure 17:
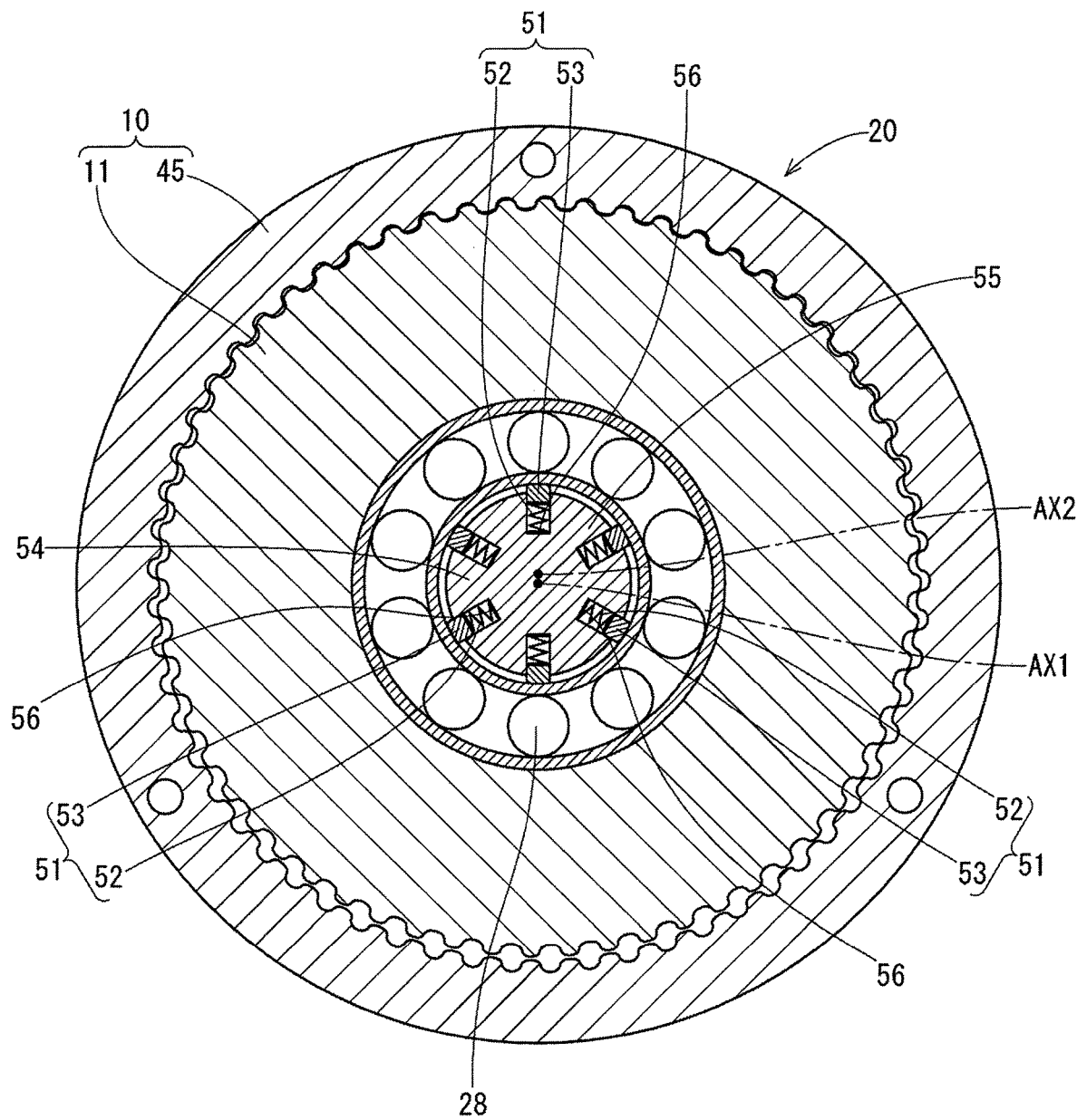
FIG. 17 is a schematically enlarged cross sectional view showing the planetary gear train of the internal engagement type according to a modification of the fourth embodiment of the present disclosure.

As shown in FIG. 17, multiple displacement preventing units 51 are provided between an eccentric portion 55 and the bearing 28. Each of the displacement preventing units 51 includes a spring 52 and a pushing rod 53. Multiple radial holes 56 are formed in the eccentric portion 55 of a first shaft 54. The pushing rod 53 is movably provided in each of the radial holes 56 and its radial-outside end is outwardly projected from an outer periphery of the first shaft 54. The spring 52 is provided in each of the radial holes 56 for biasing the pushing rod 53 in the radial-outward direction to the inner race of the bearing 28. According to the above structure, it is possible to prevent not only the radial displacement of the external gear 11 with respect to the internal gear 45 in the radial direction but also the inclination of the center axis of the external gear 11, in the same manner to the fourth embodiment.

Further Embodiments and/or Modifications (M1) In the above embodiments, the transverse cross-sectional shape of the tooth-front portion of the external gear or the internal gear is formed by the interpolation curved line, which corresponds to the spline curved line. The interpolation curved line is not limited to the spline curved line but any other curved line, which may be obtained by a different interpolation method, can be used for the interpolation curved line. For example, a Lagrange's interpolation curved line, a polynomial interpolation curved line, a Bezier's curved line or the like may be used as the interpolation curved line for the transverse cross-sectional shape of the tooth-front portions.

(M2) The run-out points, over which the external tooth-front curved line or the internal tooth-front curved line passes, are not limited to those points defined by the definitions (1-13) to (1-16) of the first embodiment or the definitions (2-13) to (2-16) of the second embodiment. Any other points can be set as the run-out points, so long as each point on the curved line forming the transverse cross-sectional shape of the tooth-front portion of the external gear or the internal gear satisfies that each point is expanded in the radial direction to the tooth-front portion. According to such a structure, it is possible to avoid the situation that the rotation of the external gear is locked by the unexpected engagement (the getting-stuck condition) between the external gear and the internal gear.

(M3) It is not always necessary to form the external tooth-front surface and the internal tooth-front surface, each of which has the cross-sectional shape formed by the interpolation curved line, such as, the spline curved line. Each of the external tooth-front surface and the internal tooth-front surface may be formed by a single or multiple flat surfaces. Alternatively, each of the external tooth-front surface and the internal tooth-front surface may be formed by a combination of a flat surface and a curved surface. In a case of the curved surface, the curved surface may have a constant curvature radius.

Figure 18:
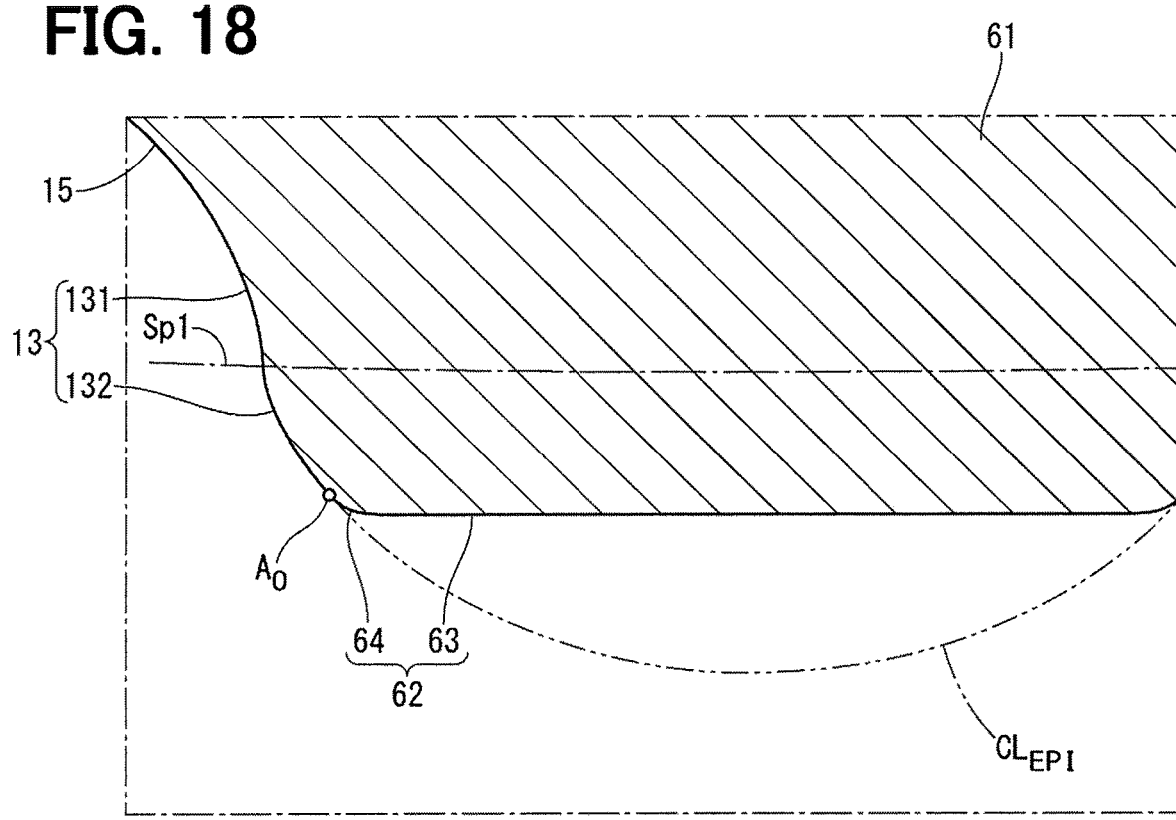
FIG. 18 is a schematically enlarged cross sectional view showing a portion (a gear tooth) of the external gear according to a further modification of the present disclosure.
Figure 19:
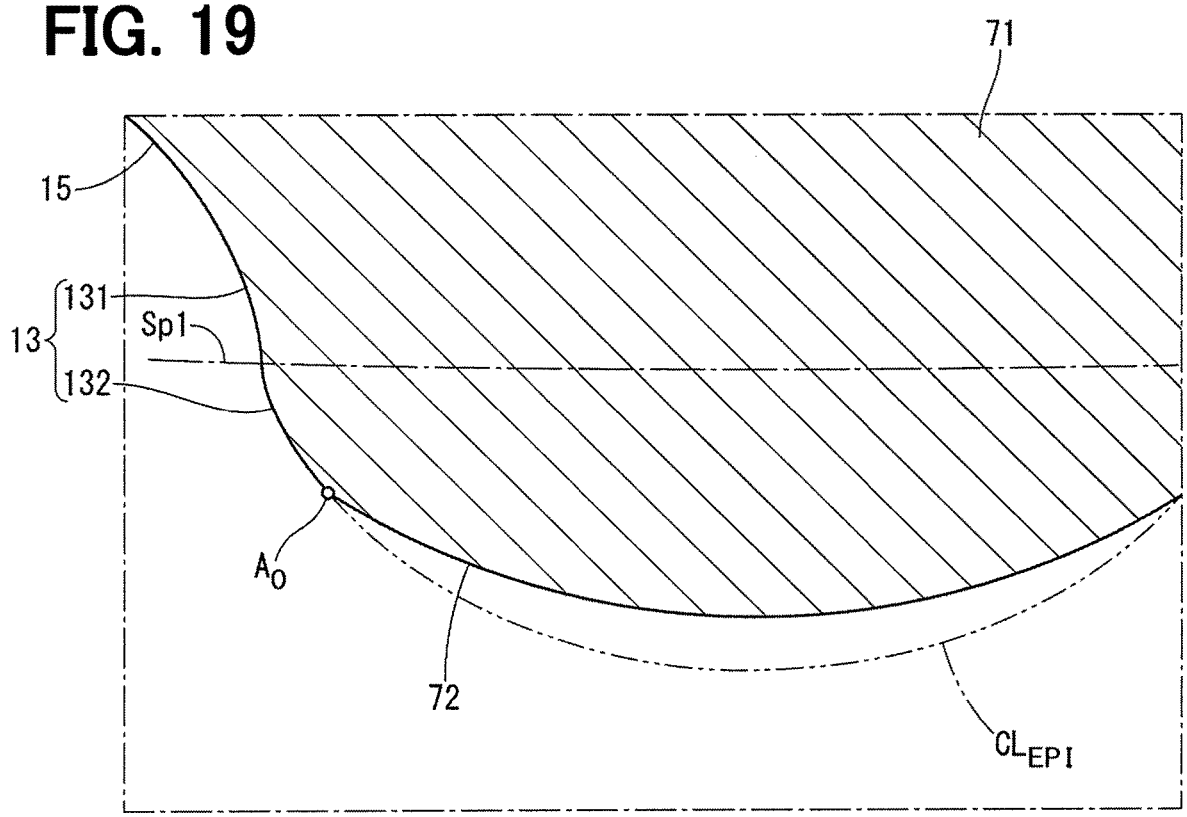
FIG. 19 is a schematically enlarged cross sectional view showing a portion (a gear tooth) of the external gear according to a further modification of the present disclosure.

For example, as shown in FIG. 18, an external gear 61 has an external tooth-front surface 62, which includes a flat surface 63 and a curved surface 64 for connecting the flat surface 63 to the external front-side contact surface 132. Alternatively, as shown in FIG. 19, an external gear 71 has an external tooth-front surface 72, which has a constant curvature radius. The above modifications shown in FIGS. 18 and 19 for the external gear can be also applied to the internal gear.

(M4) The above fourth embodiment (FIG. 16) and its modification (FIG. 17) can be further modified in such a way that the displacement preventing unit may be made of another elastic member, such as, a plate spring or the like. The elastic member may be so arranged as to directly push the inner race of the bearing, without the pushing rod.

Alternatively, the displacement preventing unit may be composed of gel-like material, for example, grease which is provided from the beginning between the first shaft and the bearing.

Furthermore, the displacement preventing unit may be composed of an oil chamber formed between the first shaft and the bearing and fluid (such as, oil) filled in the oil chamber.

The place of the displacement preventing unit is not limited to the place between the first shaft and the bearing. For example, the displacement preventing unit may be provided at a position between the external gear and the bearing.

As above, the displacement preventing unit can be provided at any position and can be composed of various kinds of different materials and/or parts, so long as it can prevent the relative displacement between the external gear and the internal gear. In addition, the displacement preventing unit may be so structured that it can prevent either the radial displacement between the external gear and the internal gear in the radial direction or the inclination of the center axis of the external gear.

(M5) The planetary gear train of the internal engagement type may be applied not only to the speed decreasing device but also to a speed increasing device. In addition, the planetary gear train of the internal engagement type may be applied to any other driving device than the shift-by-wire system.

(M6) The transmission unit 23 may be modified in such a way that the pin 34 is formed in the flanged portion 32 of the second shaft 24 and the pin hole 33 is formed in the external gear 11. Alternatively, the transmission unit 23 may be composed of a universal joint or any other structure. In other words, the transmission unit 23 can be composed of any kinds of the structure, which can transmits the self-rotation component of the external gear 11.

The present disclosure should not be limited to the above explained embodiments and/or the modifications, but can be further modified in various manners without departing from a spirit of the present disclosure.

What is claimed is:

1. A planetary gear train of an internal engagement type comprising:
    an internal gear having multiple internal gear teeth at an inner peripheral portion thereof, each tooth surface of which includes an internal tooth-bottom surface, an internal tooth-front surface and an internal contact surface formed between the internal tooth-bottom surface and the internal tooth-front surface, wherein the internal contact surface has an internal bottom-side contact surface connected to the internal tooth-bottom surface and an internal front-side contact surface connected to the internal tooth-front surface; and
    an external gear having multiple external gear teeth at an outer peripheral portion thereof, each tooth surface of which includes an external tooth-bottom surface, an external tooth-front surface and an external contact surface formed between the external tooth-bottom surface and the external tooth-front surface, wherein the external contact surface has an external bottom-side contact surface connected to the external tooth-bottom surface and an external front-side contact surface connected to the external tooth-front surface, and wherein the external contact surface of the external gear is internally and operatively engaged with the internal contact surface of the internal gear,
    wherein each of the internal tooth-bottom surface and the internal bottom-side contact surface is located at a radial-outside position of a second pitch circle of the internal gear, while each of the internal tooth-front surface and the internal front-side contact surface is located at a radial-inside position of the second pitch circle,
    wherein each of the external tooth-bottom surface and the external bottom-side contact surface is located at a radial-inside position of a first pitch circle of the external gear, while each of the external tooth-front surface and the external front-side contact surface is located at a radial-outside position of the first pitch circle,
    wherein, in a transverse cross section perpendicular to a center axis of the internal gear, the tooth surface of the internal gear is formed in a way that;
    (1a) a transverse cross-sectional shape of the internal front-side contact surface is formed by a hypocycloid curved line; and
    (1b) a transverse cross-sectional shape of the internal bottom-side contact surface as well as a transverse cross-sectional shape of the internal tooth-bottom surface is formed by an epicycloid curved line,
    wherein, in the transverse cross section perpendicular to the center axis of the internal gear, the tooth surface of the external gear is formed in a way that;
    (2a) a transverse cross-sectional shape of the external tooth-bottom surface as well as a transverse cross-sectional shape of the external bottom-side contact surface is formed by the hypocycloid curved line; and
    (2b) a transverse cross-sectional shape of the external front-side contact surface is formed by the epicycloid curved line,
    wherein the external tooth-front surface is formed at a radial-inside position of a reference epicycloid curved line, which is continuously connected to the external front-side contact surface, and
    wherein a connecting point between the external tooth-front surface and the external front-side contact surface is located at such a point that a contact surface length of the external contact surface becomes equal to or more than twenty percent of a total surface length of the external tooth in the transverse cross section.

2. The planetary gear train according to claim 1, wherein the internal tooth-front surface is formed at a radial-outside position of a reference hypocycloid curved line, which is continuously connected to the internal front-side contact surface, and
    a connecting point between the internal tooth-front surface and the internal front-side contact surface is located at such a point that a contact surface length of the internal contact surface becomes equal to or more than twenty percent of a total surface length of the internal tooth in the transverse cross section.

3. The planetary gear train according to claim 1, wherein the connecting point of the external gear is located at a radial-outside position of a reference pressure-angle point, at which a pressure angle of the tooth surface of the external gear is thirty degrees.

4. The planetary gear train according to claim 1, further comprising;
    a displacement preventing unit for preventing a radial displacement between the external gear and the internal gear and/or an inclination of an eccentric center axis of the external gear with respect to the center axis of the internal gear.

5. The planetary gear train according to claim 1, wherein in the transverse cross section of the external gear, a tangent line of the external tooth-front surface at the connecting point coincides with a tangent line of the external front-side contact surface at the connecting point.

6. The planetary gear train according to claim 1, wherein a portion of the external tooth-front surface, which is connected to the external front-side contact surface, is formed by a circular arc line in the transverse cross section of the external gear.

7. A planetary gear train of an internal engagement type comprising:
    an internal gear having multiple internal gear teeth at an inner peripheral portion thereof, each tooth surface of which includes an internal tooth-bottom surface, an internal tooth-front surface and an internal contact surface formed between the internal tooth-bottom surface and the internal tooth-front surface, wherein the internal contact surface has an internal bottom-side contact surface connected to the internal tooth-bottom surface and an internal front-side contact surface connected to the internal tooth-front surface; and
    an external gear having multiple external gear teeth at an outer peripheral portion thereof, each tooth surface of which includes an external tooth-bottom surface, an external tooth-front surface and an external contact surface formed between the external tooth-bottom surface and the external tooth-front surface, wherein the external contact surface has an external bottom-side contact surface connected to the external tooth-bottom surface and an external front-side contact surface connected to the external tooth-front surface, and wherein the external contact surface of the external gear is internally and operatively engaged with the internal contact surface of the internal gear, wherein each of the internal tooth-bottom surface and the internal bottom-side contact surface is located at a radial-outside position of a second pitch circle of the internal gear, while each of the internal tooth-front surface and the internal front-side contact surface is located at a radial-inside position of the second pitch circle, wherein each of the external tooth-bottom surface and the external bottom-side contact surface is located at a radial-inside position of a first pitch circle of the external gear, while each of the external tooth-front surface and the external front-side contact surface is located at a radial-outside position of the first pitch circle, wherein, in a transverse cross section perpendicular to a center axis of the internal gear, the tooth surface of the internal gear is formed in a way that;

(1a) a transverse cross-sectional shape of the internal front-side contact surface is formed by a hypocycloid curved line; and (1b) a transverse cross-sectional shape of the internal bottom-side contact surface as well as a transverse cross-sectional shape of the internal tooth-bottom surface is formed by an epicycloid curved line, wherein, in the transverse cross section perpendicular to the center axis of the internal gear, the tooth surface of the external gear is formed in a way that;

(2a) a transverse cross-sectional shape of the external tooth-bottom surface as well as a transverse cross-sectional shape of the external bottom-side contact surface is formed by the hypocycloid curved line; and (2b) a transverse cross-sectional shape of the external front-side contact surface is formed by the epicycloid curved line, wherein the internal tooth-front surface is formed at a radial-outside position of a reference hypocycloid curved line, which is continuously connected to the internal front-side contact surface, and wherein a connecting point between the internal tooth-front surface and the internal front-side contact surface is located at such a point that a contact surface length of the internal contact surface becomes equal to or more than twenty percent of a total surface length of the internal tooth in the transverse cross section.

8. The planetary gear train according to claim 7, wherein the external tooth-front surface is formed at a radial-inside position of a reference epicycloid curved line, which is continuously connected to the external front-side contact surface, and a connecting point between the external tooth-front surface and the external front-side contact surface is located at such a point that a contact surface length of the external contact surface becomes equal to or more than twenty percent of a total surface length of the external tooth in the transverse cross section.

9. The planetary gear train according to claim 7, wherein the connecting point of the internal gear is located at a radial-inside position of a reference pressure-angle point, at which a pressure angle of the tooth surface of the internal gear is thirty degrees.

10. The planetary gear train according to claim 7, further comprising;

a displacement preventing unit for preventing a radial displacement between the external gear and the internal gear and/or an inclination of a center axis of the external gear with respect to the center axis of the internal gear.

11. The planetary gear train according to claim 7, wherein in a transverse cross section of the internal gear, a tangent line of the internal tooth-front surface at the connecting point coincides with a tangent line of the internal front-side contact surface at the connecting point.

12. The planetary gear train according to claim 7, wherein a portion of the internal tooth-front surface, which is connected to the internal front-side contact surface, is formed by a circular arc line in the transverse cross section of the internal gear.

\* \* \* \* \*